United States Patent
Maezawa et al.

(10) Patent No.: US 11,609,736 B2
(45) Date of Patent: Mar. 21, 2023

(54) AUDIO PROCESSING SYSTEM, AUDIO PROCESSING METHOD AND RECORDING MEDIUM

(71) Applicant: YAMAHA CORPORATION, Hamamatsu (JP)

(72) Inventors: Akira Maezawa, Hamamatsu (JP); Yoshimasa Isozaki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/519,176

(22) Filed: Nov. 4, 2021

(65) Prior Publication Data

US 2022/0147307 A1 May 12, 2022

(30) Foreign Application Priority Data

Nov. 6, 2020 (JP) .............................. JP2020-185740

(51) Int. Cl.
*G06F 3/16* (2006.01)
*G06T 11/20* (2006.01)

(52) U.S. Cl.
CPC .............. *G06F 3/16* (2013.01); *G06T 11/206* (2013.01); *G06F 2218/08* (2023.01); *G06T 2200/24* (2013.01)

(58) Field of Classification Search
CPC ..... G06F 3/16; G06T 11/206; G06K 9/00523; G10H 1/36; G10H 1/0008; G10H 1/0033; G10H 2210/076; G10H 2210/031; G10H 2210/106; G10H 2210/101; G10H 2210/091; G10G 1/00; G10G 1/02

USPC .................................... 715/727; 84/609, 610
See application file for complete search history.

(56) References Cited

U.S. PATENT DOCUMENTS

| | | | |
|---|---|---|---|
| 2010/0211200 A1* | 8/2010 | Kobayashi | G06F 3/165 700/94 |
| 2011/0003638 A1* | 1/2011 | Lee | G10H 1/368 463/43 |
| 2012/0063617 A1* | 3/2012 | Ramos | G11B 20/00826 381/119 |
| 2014/0047971 A1* | 2/2014 | Akazawa | G10H 1/0008 84/609 |

(Continued)

FOREIGN PATENT DOCUMENTS

| | | | | |
|---|---|---|---|---|
| EP | 3223274 A1 | 9/2017 | | |
| JP | 2011095397 A * | 5/2011 | ............. | G06F 9/542 |

(Continued)

*Primary Examiner* — Reza Nabi
*Assistant Examiner* — Hwei-Min Lu
(74) *Attorney, Agent, or Firm* — Rossi, Kimms & McDowell LLP

(57) ABSTRACT

An audio processing system includes at least one memory storing a program and at least one processor. The processor implements the program to analyze an audio signal including sound from a first sound source; identify, based on the analysis of the audio signal, a series of sound indicators each representing a certainty that audio components of the first sound source are included in the audio signal; identify a series of pitches, each relating to the components of the first sound source; and cause a display device to display the series of the sound indicators and the identified series of the pitches along a common time axis.

9 Claims, 13 Drawing Sheets

(56) References Cited

U.S. PATENT DOCUMENTS

| | | | |
|---|---|---|---|
| 2015/0046824 A1* | 2/2015 | Humphrey | G10H 1/0058 715/727 |
| 2017/0018282 A1* | 1/2017 | Tsai | G10L 21/0272 |
| 2017/0337910 A1 | 11/2017 | Maezawa | |
| 2018/0174559 A1* | 6/2018 | Elson | H04N 7/142 |
| 2019/0147837 A1* | 5/2019 | Maezawa | G10H 1/0008 84/609 |
| 2019/0251940 A1* | 8/2019 | Maezawa | G10H 1/366 |
| 2020/0193948 A1* | 6/2020 | Maezawa | G10H 1/0033 |

FOREIGN PATENT DOCUMENTS

| | | | | |
|---|---|---|---|---|
| JP | 2016099512 A | 5/2016 | | |
| JP | 2017207615 A | 11/2017 | | |
| WO | WO-2005057551 A1 * | 6/2005 | | G10L 21/0208 |
| WO | WO-2019058942 A1 * | 3/2019 | | G06F 9/542 |

\* cited by examiner

FIG. 1
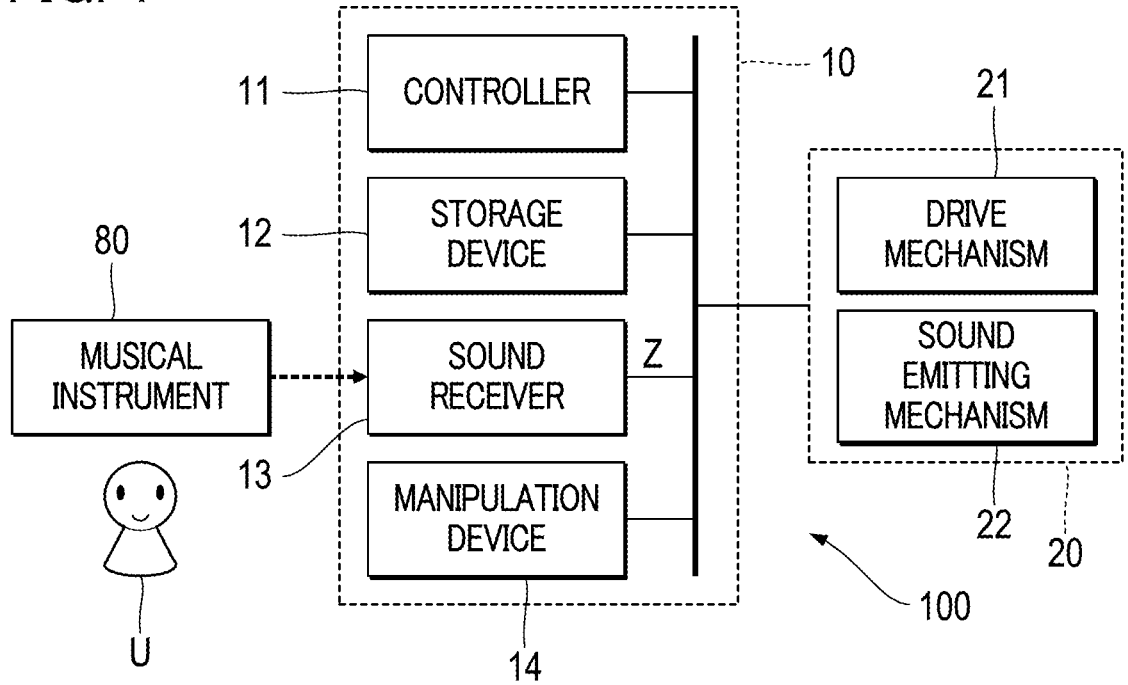
FIG. 2
MUSIC DATA D
| REFERENCE DATA Da | PLAY PART |
| PERFORMANCE DATA Db | REPRODUCTION PART |
FIG. 3
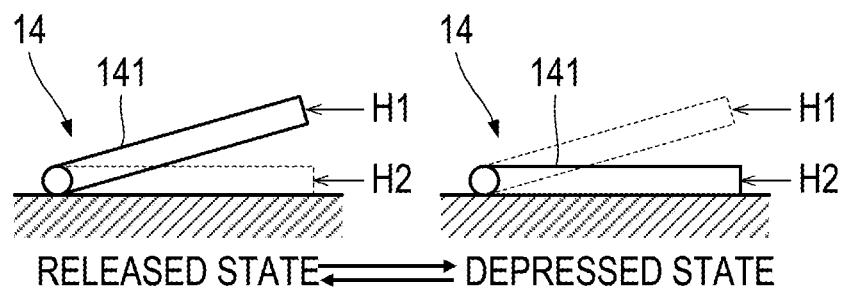

AUDIO PROCESSING SYSTEM, AUDIO PROCESSING METHOD AND RECORDING MEDIUM

CROSS REFERENCE TO RELATED APPLICATION

This application is based on and claims priority from Japanese Patent Application No. 2020-185740, which was filed on Nov. 6, 2020, and the entire contents of which are incorporated herein by reference.

BACKGROUND

Technical Field

The present disclosure relates to techniques for analyzing audio signals.

Description of Related Art

There is known in the art a technique by which reproduction of a musical piece follows a performance being played by a human player. In one example, Japanese Application Laid-Open Publication No. 2017-207615 discloses a technique for controlling automatic performance of a music piece. In this disclosure, an audio signal, which is representative of a music piece and is generated by a performance of the music piece, is analyzed. A play position in the music piece is estimated by the analysis to control automatic performance of the music piece in accordance with a result of the estimation.

To estimate a play position, it is necessary to provide in advance reference data for use in collating an audio signal. Two processes are required to generate the reference data, one of which is analysis of a reference signal representative of a musical sound generated in a prior performance, and the other of which is a modification of the result of the analysis in accordance with a user's instruction.

SUMMARY

In view of the circumstances described above, there exists a need for a technique that enables a user to easily confirm and modify a result of an analysis of reference data during a process of generating reference data.

To solve the above problem, an audio processing system according to one aspect of the present disclosure includes at least one memory storing a program; and at least one processor that implements the program to: analyze an audio signal including sound from a first sound source; identify, based on the analysis of the audio signal, a series of sound indicators each representing a certainty that audio components of the first sound source are included in the audio signal; identify a series of pitches, each relating to the components of the first sound source; and cause a display device to display the series of the sound indicators and the identified series of the pitches along a common time axis.

A computer-implemented audio processing method according to one aspect of the present disclosure includes analyzing an audio signal including sound from a first sound source; identifying, based on the analyzing of the audio signal, a series of sound indicators each representing a certainty that audio components of the first sound source are included in the audio signal; identifying a series of pitches each relating to the components of the first sound source; and displaying, on a display device, the series of the sound indicators and the identified series of the pitches along a common time axis.

A non-transitory recording medium for storing a program executable by a computer to execute a method includes analyzing an audio signal including sound from a first sound source; identifying, based on the analyzing of the audio signal, a series of sound indicators each representing a certainty that audio components of the first sound source are included in the audio signal; identifying a series of pitches each relating to the components of the first sound source; and displaying, on a display device, the series of the sound indicators and the series of the pitches along a common time axis.

BRIEF DESCRIPTION OF THE DRAWINGS

FIG. 1 is a block diagram showing an example configuration of a reproduction system according to a first embodiment.

FIG. 2 is a schematic diagram of music data.

FIG. 3 is an explanatory diagram of a configuration and statuses of a manipulation device.

DESCRIPTION OF THE EMBODIMENTS

A: First Embodiment

Figure 4:
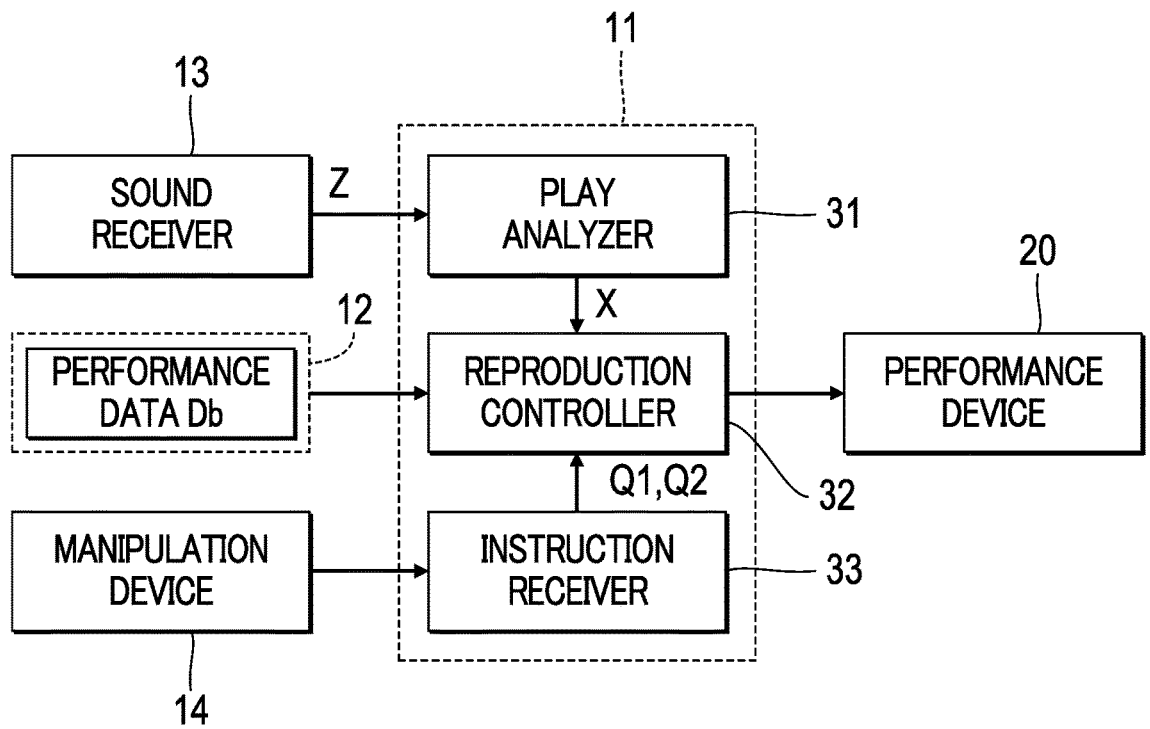
FIG. 4 is a block diagram showing a functional configuration of an audio processing system.

FIG. 1 is a block diagram showing an example configuration of a reproduction system 100 according to a first embodiment. The reproduction system 100 is installed in a space where a user U is present. The user U is a performer who plays a part of a music piece (hereafter, "play part") using a musical instrument 80, such as a string musical instrument.

The reproduction system 100 is a computer system that generates music sounds associated with the play part of the music piece in conjunction with playing of the play part by the user U. Specifically, the reproduction system 100 generates a part (hereafter, "reproduction part") of the music piece. The reproduction part differs from the play part. In one example, a play part is one or more parts constituting the main melody of the music piece. In another example, the reproduction part is an accompaniment part of the music piece. As will be understood from the above description, performance of the music piece is achieved by the playing of the play part by the user U and the reproduction of the reproduction part by the reproduction system 100 in coordination with each other. The play part and the reproduction part may be parts in common in the music piece. The accompaniment of the music piece may consist of the play part, and the main melody of the music piece may consist of the reproduction part.

The reproduction system 100 includes an audio processing system 10 and a performance device 20. The audio processing system 10 is independent from the performance device 20, and communication between the two may be by wire or wirelessly. The audio processing system 10 and the performance device 20 may be formed to be integral.

The performance device 20 is a reproduction device, in which a reproduction part of the music piece is reproduced under control of the audio processing system 10. Specifically, the performance device 20 is an automatic performance instrument that automatically plays the reproduction part. In one example, the performance device 20 includes an automatic musical instrument (e.g., an automatic player piano), which is different from a musical instrument 80 played by the user U. As will be understood from the above description, automatic playing is one form of "reproduction."

The performance device 20 according to the first embodiment includes a drive mechanism 21 and a sound emitting mechanism 22. The sound emitting mechanism 22 includes a mechanism that emits musical sounds. Specifically, the sound emitting mechanism 22, as in a natural keyboard instrument, includes a strike mechanism that generates a sound from a string (a sounding source) by striking the string upon depressing a key of a keyboard. The sound emitting mechanism 22 is driven by the drive mechanism 21 to carry out automatic performance of a music piece. Further, the sound emitting mechanism 22 is driven by the drive mechanism 21 based on instructions received from the audio processing system 10, to carry out automatic performance of the reproduction part.

The audio processing system 10 is a computer system that controls reproduction of a reproduction part by the performance device 20, and includes a controller 11, a storage device 12, a sound receiver 13, and a manipulation device 14. The audio processing system 10 may be realized by a portable device such as a smartphone or a tablet terminal, by a stationary device such as a personal computer, or by a combination of devices.

The controller 11 comprises one or more processors that control each element of the audio processing system 10. Examples of the processors include a Central Processing Unit (CPU), Sound Processing Unit (SPU), Digital Signal Processor (DSP), Field Programmable Gate Array (FPGA), and Application Specific Integrated Circuit (ASIC). The controller 11 may be constituted of different types of processors.

The storage device 12 comprises one or more memories that store programs implemented by the controller 11, and various data used by the controller 11. The storage device 12 comprises a known recording medium, such as a magnetic recording medium, a semiconductor recording medium, or a combination of recording media. A portable recording medium attachable to or detachable from the audio processing system 10 or a recording medium from or to which data is written of read via a communication network (e.g., cloud storage) may be used as the storage device 12.

The storage device 12 stores music data D representative of a series of notes comprising the music piece. FIG. 2 is a schematic diagram of the music data D. The music data D includes reference data Da and performance data Db. The reference data Da represents a series of notes in the play part to be played by the user U. The reference data Da represents a pitch, a sounding period, and a sound intensity (a velocity) for each of the notes in the play part. The performance data Db represents a series of notes in the reproduction part to be reproduced by the performance device 20. Specifically, the performance data Db represents a pitch, a sounding period, and a sound intensity for each of the notes in the reproduction part.

In one example, each of the reference data Da and the performance data Db is a series of pieces of data in Musical Instrument Digital Interface (MIDI) format. Each of the reference data Da and the performance data Db includes a series of pieces of indication data and a series of pieces of temporal data. The indication data indicates sounding (producing of a sound) and muting for each of the sounds corresponding to the notes. The temporal data specifies a time point of each of motions, such as the sounding and the muting for each of the sounds indicated by the indication data. In one example, the indication data indicates the motions by specifying, for example, a pitch and volume of each of the sounds. In one example, the temporal data represents an interval between two consecutive pieces of indication data. The sounding period with regard to a note representative of a specific pitch is a period from a first time point to a second time point. The first time point is a time point at which producing of a sound corresponding to the note is indicated by a piece of indication data. The second time point is a time point at which muting of the sound corresponding to the note representative of the specific pitch is indicated by a piece of indication data subsequent to the piece of indication data that indicates the producing of the sound.

The sound receiver 13 in FIG. 1 receives the sounds emitted from the musical instrument 80 played by the user U to generate an audio signal Z representative of a waveform of the sounds. In one example, the sound receiver 13 includes a microphone. The audio signal Z generated by the sound receiver 13 is converted from an analog signal to a digital signal by an A/D converter (not shown). The user U may sing the play part of the music piece using the sound receiver 13. When the user U sings the play part, the audio signal Z is generated by the sound receiver 13 and is represented as a waveform of the singing voice of the user U. As described, the meaning of "playing" includes not only playing by user U of a musical instrument 80, but also singing by user U.

The first embodiment illustrates a configuration in which the sound receiver 13 is installed in the audio processing system 10. However, the sound receiver 13 may be provided separate from the audio processing system 10 and may be connected to the audio processing system 10 either by wire or wirelessly. The audio processing system 10 may receive, as the audio signal Z, a signal supplied from an electric musical instrument such as an electric string instrument. As will be understood from the above description, the sound receiver 13 may be omitted from the audio processing system 10.

The manipulation device 14 is an input device that receives instructions from the user U. As is shown in FIG. 3, the manipulation device 14 according to the first embodiment includes a movable member 141 that moves responsive to manipulation by the user U. The movable member 141 includes a pedal operable by a foot of the user U. For example, the manipulation device 14 includes a pedal-type MIDI controller. Accordingly, the user U is able to manipulate the manipulation device 14 at a desired time point while playing the musical instrument 80 with both hands. The manipulation device 14 may be a touch panel that detects a touch on the touch panel by the user U.

The state of the manipulation device 14 is shifted from one of two states, a released state and a depressed state, responsive to manipulation by the user U. The released state is a state in which the manipulation device 14 is not manipulated by the user U. Specifically, the released state is a state in which the movable member 141 is not depressed by the user U. The released state may be expressed as a state in which the movable member 141 is at a position H1.

The depressed state is a state in which the manipulation device 14 is manipulated by the user U. Specifically, the depressed state is a state in which the movable member 141 is depressed by the user U. The depressed state may be expressed as a state in which the movable member 141 is at a position H2 that is different from the position H1. The released state is an example of a "first state," and the depressed state is an example of a "second state."

FIG. 4 is a block diagram showing a functional configuration of the audio processing system 10. The controller 11 executes the program stored in the storage device 12, thereby realizing functional elements (a play analyzer 31, a reproduction controller 32, and an instruction receiver 33) for controlling reproduction of the reproduction part by the performance device 20.

The play analyzer 31 analyzes the audio signal Z supplied from the sound receiver 13 to estimate a play position X in the music piece. The play position X is a temporal position of a part currently being played by the user U within the music piece. The play position X is represented by a time point within the music piece. The play analyzer 31 repeatedly estimates the play position X while the performance device 20 reproduces the reproduction part in conjunction with the playing of the play part by the user U. In other words, the play analyzer 31 estimates the play position X at each of time points on a time axis; the play position X moves forward in the music piece over time.

Specifically, the play analyzer 31 calculates the play position X by comparing the reference data Da of the music data D with the audio signal Z. The play analyzer 31 may estimate the play position X by use of a known analysis technique (score alignment technique). In one example, the play analyzer 31 may use the analysis technique disclosed in Japanese Patent Application Laid-Open Publication No. 2016-099512 to estimate the play position X. The play analyzer 31 may estimate the play position X by use of a statistical estimation model such as a deep neural network or a hidden Markov model.

The reproduction controller 32 causes the performance device 20 to reproduce each of the notes represented by the performance data Db. In other words, the reproduction controller 32 causes the performance device 20 to execute automatic performance of the reproduction part. Specifically, the reproduction controller 32 moves a position Y (hereafter, "reproduction position Y") of a note to be reproduced from among the notes in the music piece forward in the music piece over time. The reproduction controller 32 supplies a piece of indication data corresponding to the reproduction position Y from among the pieces of indication data in the performance data Db to the performance device 20. Thus, the reproduction controller 32 functions as a sequencer that sequentially supplies each piece of indication data included in the performance data Db to the performance device 20. The reproduction controller 32 causes the performance device 20 to reproduce the reproduction part in conjunction with the playing of the play part by the user U.

The reproduction controller 32 causes the performance device 20 to reproduce the reproduction part so as to follow the playing of the play part by the user U in accordance with a result of the estimation of the play position X executed by the play analyzer 31. This enables the automatic reproduction of the reproduction part by the performance device 20 to progress at the same tempo as the tempo of the playing of the play part by the user U. In one example, when the progress speed of the play position X (that is, the speed of the play performed by the user U) is fast, the reproduction controller 32 increases the progress speed of the reproduction position Y (the speed of reproduction executed by the performance device 20). When the progress speed of the play position X is slow, the reproduction controller 32 decreases the progress speed of the reproduction position Y. This enables the automatic reproduction of the reproduction part to be executed at the same progress speed as the progress speed of the playing by the user U such that the automatic reproduction of the reproduction part synchronizes with the movement in the play position X. Accordingly, the user U is able to play the play part with a sense that the performance device 20 is reproducing the reproduction part in accompaniment with the playing by the user U.

According to the first embodiment, the reproduction of the notes in the reproduction part follows the playing of the play part played by the user U. Therefore, an intention of the user U (e.g., musical expression) or a preference of the user U can be appropriately reflected in the reproduction of the reproduction part.

The instruction receiver 33 receives a first instruction Q1 and a second instruction Q2 from the user U. The first instruction Q1 and the second instruction Q2 are each provided responsive to manipulation of the manipulation device 14 by the user U. The first instruction Q1 is an instruction to temporarily stop the reproduction of the reproduction part by the performance device 20. The second instruction Q2 is an instruction to resume the reproduction of the reproduction part that was temporarily stopped responsive to the first instruction Q1.

Specifically, the instruction receiver 33 receives the first instruction Q1 as a result of the user U manipulating the manipulation device 14 to cause it to shift from the released state to the depressed state. By depressing the movable member 141 of the manipulation device 14, the user U provides the first instruction Q1 to the audio processing system 10. In one example, the instruction receiver 33 determines a time point when the movable member 141 starts to move from the position H1 (the released state)

toward the position H2 (the depressed state) as a time point of provision of the first instruction Q1.

The instruction receiver 33 may determine a time point when the movable member 141 reaches a point mid-way between the position H1 and the position H2 as the time point of the provision of the first instruction Q1. The instruction receiver 33 may determine a time point when the movable member 141 reaches the position H2 as the time point of the provision of the first instruction Q1.

The instruction receiver 33 receives the second instruction Q2 as a result of the user U manipulating the manipulation device 14 to cause it to shift from the depressed state to the released state. By releasing the movable member 141 of the manipulation device 14 from the state in which the movable member 141 is depressed, the user U provides the second instruction Q2 to the audio processing system 10. In one example, the instruction receiver 33 determines a time point when the movable member 141 starts to move from the position H2 (the depressed state) toward the position H1 (the released state) as a time point of provision of the second instruction Q2. The instruction receiver 33 may determine a time point when the movable member 141 reaches a point mid-way between the position H2 and the position H1 as the time point of the provision of the second instruction Q2. The instruction receiver 33 may determine a time point when the movable member 141 reaches the position H1 as the time point of the provision of the second instruction Q2.

The user U can provide the first instruction Q1 and the second instruction Q2 at any time point during the playing of the play part. Therefore, the user U can change an interval between the time point of the provision of the first instruction Q1 and the time point of the provision of the second instruction Q2. In one example, the user U provides the first instruction Q1 before starting a rest period in the music piece, and provides the second instruction Q2 after a rest period of a duration desired by the user U has passed.

Figure 5:
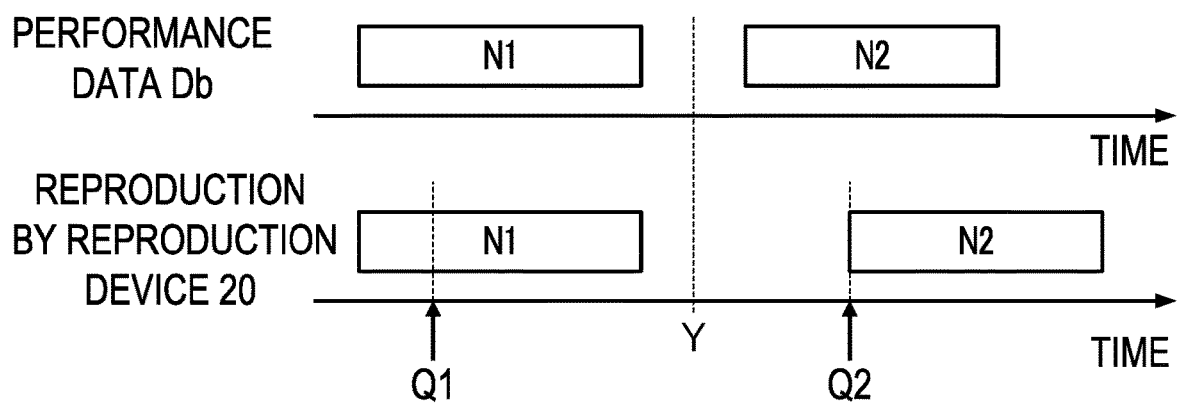
FIG. 5 is an explanatory diagram of a relationship between reproduction of a reproduction part by a performance device, and first and second instructions.

FIG. 5 is an explanatory diagram of a relationship between a reproduction of the reproduction part by the performance device 20, the first instruction Q1, and the second instruction Q2. Both a sounding period of each note represented by the performance data Db and a sounding period of each note to be reproduced by the performance device 20 are shown in FIG. 5.

Each of notes N1 in FIG. 5 is included in the notes represented by the performance data Db. The note N1 is a note associated with the first instruction Q1. Specifically, the note N1 is included in the notes in the reproduction part. The note N1 is a note that is reproduced by the performance device 20 at the time of the provision of the first instruction Q1. When the first instruction Q1 is provided by the user U, the reproduction controller 32 causes the performance device 20 to continue to reproduce the note N1 until the end of the sounding period of the note N1 represented by the performance data Db. In one example, the reproduction controller 32 supplies the indication data indicating the muting of the note N1 to the performance device 20 at the end of the sounding period of the note N1. As will be understood from the above description, the reproduction of the note N1 does not stop immediately upon provision by the user U of the first instruction Q1, but rather continues after provision of the first instruction Q1 until the end represented by the performance data Db. Here, the note N1 is an example of a "first sound."

Each of notes N2 in FIG. 5 is included in the notes represented by the performance data Db. The note N2 is a note subsequent to the note N1. The reproduction controller 32 causes the performance device 20 to start to reproduce the note N2 in response to the provision of the second instruction Q2 by the user U after stopping the reproduction of the note N1. Thus, the reproduction of the note N2 starts in response to the provision of the second instruction Q2 but not in relation to a starting point of the sounding period of the note N2 represented by the performance data Db or the duration of the interval between the note N1 and the note N2 represented by the performance data Db. Specifically, the reproduction controller 32 supplies the indication data on the note N2 in the performance data Db to the performance device 20 when the instruction receiver 33 receives the second instruction Q2. Accordingly, the reproduction of the note N2 is started immediately after the provision of the second instruction Q2. Here, the note N2 is an example of "second sound."

Figure 6:
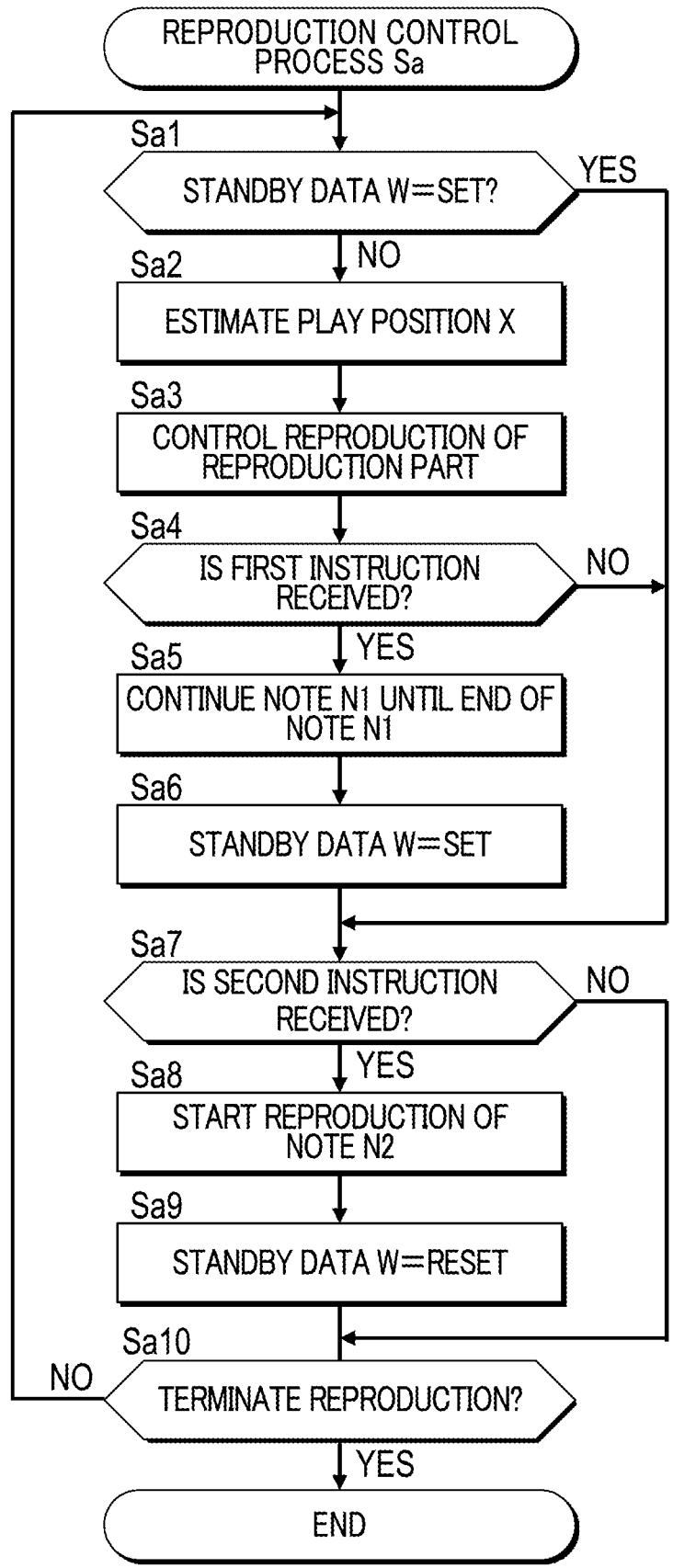
FIG. 6 is a flowchart showing an example of a specific procedure of a reproduction control process.

FIG. 6 is a flowchart illustrating a specific procedure of an operation Sa executed by the controller 11 to control the performance device 20 (hereafter, "reproduction control process"). The reproduction control process Sa is started upon receipt of an instruction from the user U.

When the reproduction control process Sa starts, the controller 11 determines whether standby data W is set (Sa1). The standby data W is, for example, a flag, and indicates that the reproduction of the reproduction part has been temporarily stopped due to the provision of the first instruction Q1. The standby data W is stored in the storage device 12. Specifically, the standby data W is set (for example, set to W=1) when the first instruction Q1 is provided. The standby data W is reset (for example, reset to W=0) when the second instruction Q2 is provided. In other words, the standby data W indicates a state in which the controller 11 waits for the restart of the reproduction of the reproduction part.

When the standby data W is reset (Sa1: NO), the controller 11 (the play analyzer 31) analyzes the audio signal Z supplied from the sound receiver 13 to estimate the play position X (Sa2). The controller 11 (the reproduction controller 32) causes the performance device 20 to reproduce the reproduction part in accordance with the result of the estimation of the play position X (Sa3). In other words, the controller 11 controls the reproduction of the reproduction part by the performance device 20 to follow the playing of the play part played by the user U.

The controller 11 (the instruction receiver 33) determines whether the first instruction Q1 is received from the user U (Sa4). When the first instruction Q1 is received (Sa4: YES), the controller 11 (the reproduction controller 32) causes the performance device 20 to continue to reproduce the note N1 that is being reproduced when the first instruction Q1 is provided, until the end of the sounding period of the note N1 represented by the performance data Db (Sa5). Specifically, the controller 11 causes the reproduction position Y to proceed at the same progress speed (tempo) as the progress speed of the reproduction position Y at the time point when the first instruction Q1 is provided. When the reproduction position Y reaches the end of the sounding period of the note N1, the controller 11 supplies the indication data indicating the muting of the note N1 to the performance device 20. After execution of the above processes, the controller 11 sets the standby data W (W=1) (Sa6). Before Step Sa5, the standby data W (Sa6) may be updated.

When the standby data W is set, the determination result at step Sa1 is affirmative. In this case, that is, when the standby data W is set (Sa1: YES), the estimation of the play position X (Sa2), the reproduction control of the reproduction part (Sa3), and processes for the note N1 (Sa4 to Sa6) are not executed. In other words, the reproduction control of the reproduction part linked with the play position X is stopped in response to receipt of the first instruction Q1 from the user U. When the first instruction Q1 is not received (Sa4: NO), the processes for the note N1 (Sa5 and Sa6) are not executed.

The controller 11 (the instruction receiver 33) determines whether the second instruction Q2 is received from the user U (Sa7). When the second instruction Q2 is received (Sa7: YES), the controller 11 (the reproduction controller 32) causes the performance device 20 to reproduce the note N2 subsequent to the note N1 (Sa8). Specifically, the controller 11 sets the reproduction position Y to the starting point of the note N2. In other words, the reproduction of the reproduction part that has been stopped as a result of receipt of the first instruction Q1 is resumed as a result of receipt of the second instruction Q2. The controller 11 resets the standby data W (W=0) (Sa9). As described above, when the standby data W is reset, the determination result at Step Sa1 becomes negative. Therefore, the estimation of the play position X (Sa2) and the reproduction control of the reproduction part (Sa3) are resumed in response to receipt of the second instruction Q2. The standby data W (Sa8) may be updated before Step Sa8.

The controller 11 determines whether to terminate the reproduction of the reproduction part by the performance device 20 (Sa10). In one example, when the reproduction is complete up to the end of the reproduction part, or when the user U indicates termination of the reproduction, the controller 11 determines termination of the reproduction of the reproduction part. When the controller 11 determines continuation of the reproduction of the reproduction part (Sa10: NO), the controller 11 moves the process to Step Sa1 to repeat the processes described above (Sa1 to Sa9). In contrast, when the controller 11 determines termination of the reproduction of the reproduction part (Sa10: YES), the reproduction control process Sa is completed.

As stated in the foregoing description, according to the first embodiment, the note N1 associated with the first instruction Q1 received from the user U is reproduced, the reproduction of the note N1 is then stopped, and the reproduction of the note N2 subsequent to the note N1 is then started in response to the second instruction Q2 received from the user U. The interval between the period of the reproduction of the note N1 and the period of the reproduction of the note N2 (e.g., the duration of the rest period in the music piece) may vary based on each of time points including the time point of the provision of the first instruction Q1 and the time point of the provision of the second instruction Q2.

In the first embodiment, the reproduction of the note N1 being reproduced at the time of the provision of the first instruction Q1 continues until the end of the note N1 represented by the performance data Db even after the provision of the first instruction Q1. This enables the reproduction of the note N1 to appropriately continue in accordance with the performance data Db, as compared with a configuration in which the reproduction of the note N1 stops at the time of the provision of the first instruction Q1.

In the first embodiment, the manipulation of the manipulation device 14 by the user U can change the interval between the note N1 and the note N2 to an interval having an appropriate duration in accordance with an intended preference of the user U. Particularly in the first embodiment, the first instruction Q1 is provided in response to a shift of the manipulation device 14 from the released state to the depressed state, with the depressed state being maintained, and then the second instruction Q2 is generated in response to a shift of the manipulation device 14 from the depressed state to the released state at a desired time point after the provision of the first instruction Q1. In other words, the first instruction Q1 and the second instruction Q2 are generated responsive to manipulations by which the released state is shifted to the depressed state and then the depressed state is shifted to the released state. Therefore, as compared with a configuration in which the manipulation for shifting the manipulation device 14 from the released state to the depressed state is required for each of the first instruction Q1 and the second instruction Q2, the manipulation of the manipulation device 14 by the user U is simplified.

B: Second Embodiment

The second embodiment will now be described. In the embodiments shown in the following, elements having the same functions as in the first embodiment are denoted by the same reference numerals as used for like elements in the description of the first embodiment, and detailed description thereof is omitted, as appropriate.

In the first embodiment, responsive to the provision of the first instruction Q1, the reproduction position Y progresses at the same progress speed as the progress speed of the reproduction position Y at the time point when the first instruction Q1 is provided. The reproduction of the note N1 stops when the reproduction position Y reaches the end of the note N1. The reproduction controller 32 according to the second embodiment changes the progress speed of the reproduction position Y (that is, the progress speed of the reproduction of the reproduction part) after the provision of the first instruction Q1 in accordance with a manipulation velocity V1 of the manipulation of the movable member 141. The manipulation velocity V1 is a velocity of the movable member 141 that moves from the position H1 corresponding to the released state toward the position H2 corresponding to the depressed state. In one example, the manipulation velocity V1 is an average of velocities of the movable member 141 calculated during a period in which the movable member 141 moves from the position H1 to the position H2.

Figure 7:
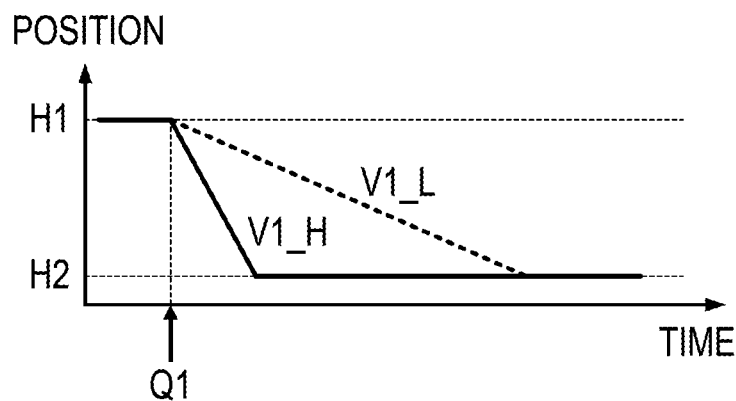
FIG. 7 is an explanatory diagram of a state of a manipulation device according to a second embodiment.

FIG. 7 is an explanatory diagram of a state of the manipulation device 14 according to the second embodiment. As shown in FIG. 7, the instruction receiver 33 receives the first instruction Q1 at the time point when the movable member 141 starts to move from the position H1 toward the position H2. The reproduction controller 32 controls the progress speed of the reproduction position Y after the provision of the first instruction Q1 in accordance with the manipulation velocity V1 of the manipulation of the movable member 141.

Specifically, the reproduction controller 32 increases the progress speed of the reproduction position Y when the manipulation velocity V1 is fast. In one example, as shown in FIG. 7, the progress speed of the reproduction position Y at the time point when the manipulation velocity V1 is the velocity V1_H is faster than the progress speed of the reproduction position Y at the time point when the manipulation velocity V1 is the velocity V1_L (V1_L<V1_H). Therefore, the duration of the note N1 is reduced as the manipulation velocity V1 becomes faster. In one example, the duration of the note N1 in a situation in which the manipulation velocity V1 is the velocity V1_H is shorter than the duration of the note N1 in a situation in which the manipulation velocity V1 is the velocity V1_L.

The second embodiment can obtain the same effects as those of the first embodiment. The second embodiment has an advantage in that the user U can adjust the duration of the note N1, since the duration of the note N1 is controlled in accordance with the manipulation velocity V1. In the second embodiment, the manipulation device 14 for providing the first instruction Q1 and the second instruction Q2 is also used for adjustment of the duration of the note N1. Therefore, the second embodiment has an advantage in that the user U can carry out operations with ease compared to a configuration in which the user U operates a device to adjust the duration of the note N1 in addition to a device to provide the first instruction Q1 and the second instruction Q2.

C: Third Embodiment

In the first embodiment, the reproduction of the note N2 is started immediately after the provision of the second instruction Q2. In the second embodiment, a time from the time point of the provision of the second instruction Q2 to the time point of starting the reproduction of the note N2 (hereafter, "delay time") varies in accordance with a manipulation velocity V2. The manipulation velocity V2 is a velocity of the movable member 141 that moves from the position H2 corresponding to the depressed state toward the position H1 corresponding to the released state. In one example, the manipulation velocity V2 is an average of velocities of the movable member 141 calculated during a period in which the movable member 141 moves from the position H2 to the position H1.

Figure 8:
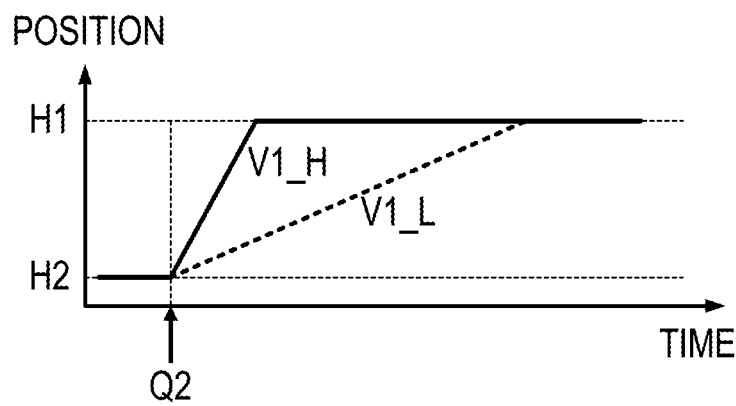
FIG. 8 is an explanatory diagram of a state of a manipulation device according to a third embodiment.

FIG. 8 is an explanatory diagram of a state of the manipulation device 14 according to the third embodiment. As shown in FIG. 8, the instruction receiver 33 receives the second instruction Q2 at the time point when the movable member 141 starts to move from the position H2 toward the position H1. The reproduction controller 32 changes a delay time of the time point of reproducing the note N2 in accordance with the manipulation velocity V2.

Specifically, since the manipulation velocity V2 is fast, the reproduction controller 32 reduces the delay time. In one example, as shown in FIG. 8, the delay time in a situation in which the manipulation velocity V2 is the velocity V2_L is longer than the delay time in a situation in which the manipulation velocity V2 is the velocity V2_H (V2_H>V2_L). Therefore, when the reproduction of the note N2 is delayed, the time point on a time axis as the manipulation velocity V2 is slower.

The third embodiment can obtain the same effects as those of the first embodiment. The third embodiment has an advantage in that the user U can adjust a starting point of the first note N2 in a situation in which the reproduction of the reproduction part is resumed, since the time point when the reproduction of the note N2 starts is controlled in accordance with the manipulation velocity V2. In the third embodiment, the manipulation device 14 for providing the first instruction Q1 and the second instruction Q2 is also used for adjusting the starting point of the note N2. Therefore, the third embodiment has an advantage in that the user U can carry out operations with ease as compared with a configuration in which the user U operates a device for adjusting the starting point of the note N2 in addition to a device for providing the first instruction Q1 and the second instruction Q2. The configuration of the second embodiment may be applied to the third embodiment.

D: Fourth Embodiment

Figure 9:
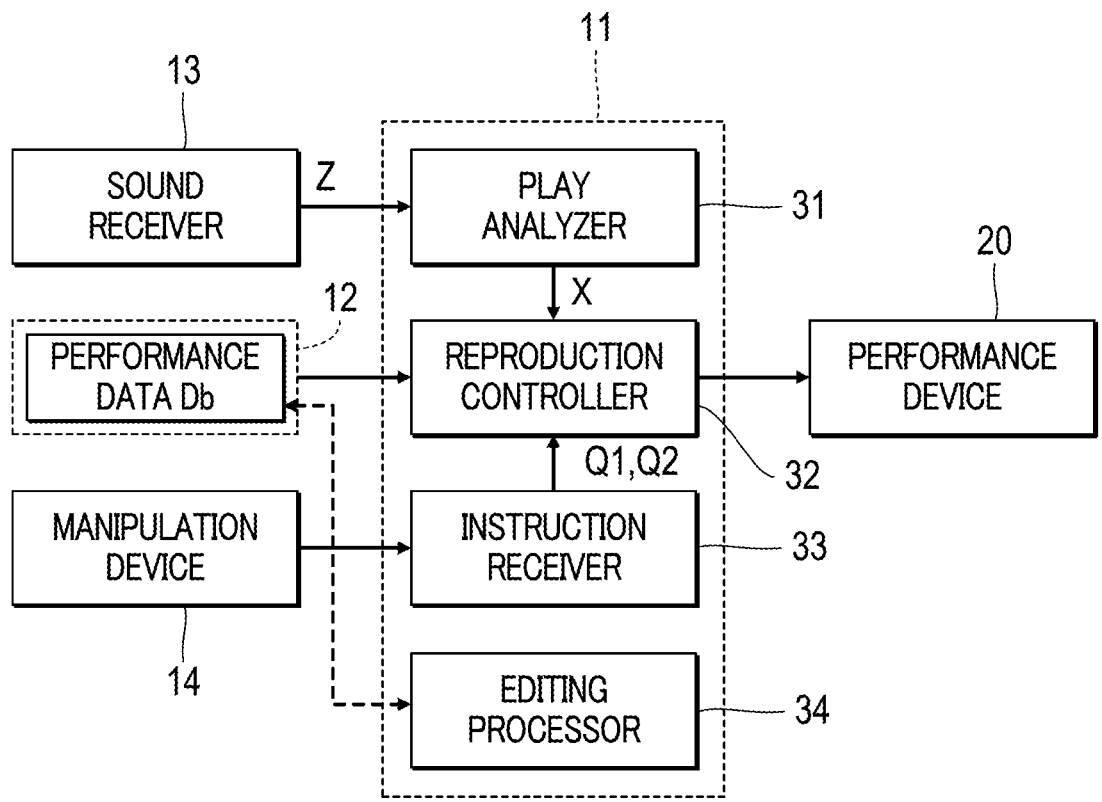
FIG. 9 is a block diagram showing an example functional configuration of an audio processing system according to a fourth embodiment.

FIG. 9 is a block diagram showing an example functional configuration of the audio processing system 10 according to the fourth embodiment. The controller 11 in the fourth embodiment functions as an editing processor 34 in addition to the same elements as those of the first embodiment (the play analyzer 31, the reproduction controller 32, and the instruction receiver 33). The editing processor 34 edits the performance data Db stored in the storage device 12 in response to an instruction received from the user U. Operations of elements other than the editing processor 34 are identical to those of the first embodiment. Therefore, the fourth embodiment can obtain the same effects as those of the first embodiment. The configuration of the second or third embodiment may be applied to the fourth embodiment.

Figure 10:
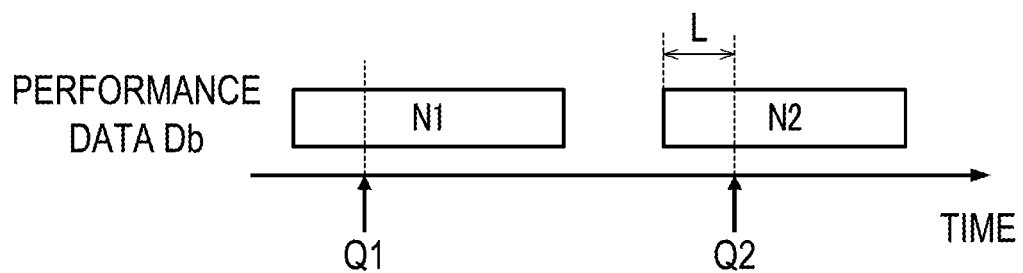
FIG. 10 is an explanatory diagram of an operation of an editing processor.

FIG. 10 is an explanatory diagram of an operation of the editing processor 34. In FIG. 10, notes N1 and N2 are represented by the reproduction part of the performance data Db. As described in each of the foregoing embodiments, the first and second instructions Q1 and Q2 may be provided at any time point by the user U. Therefore, a time difference L exists between the starting time point of the note N2 represented by the performance data Db and a time point when the second instruction Q2 is provided. The editing processor 34 determines the length of the time difference L by subtracting the starting time point of the note N2 from the time point when the second instruction Q2 is provided. The editing processor 34 edits the performance data Db to reduce the time difference L.

Figure 11:
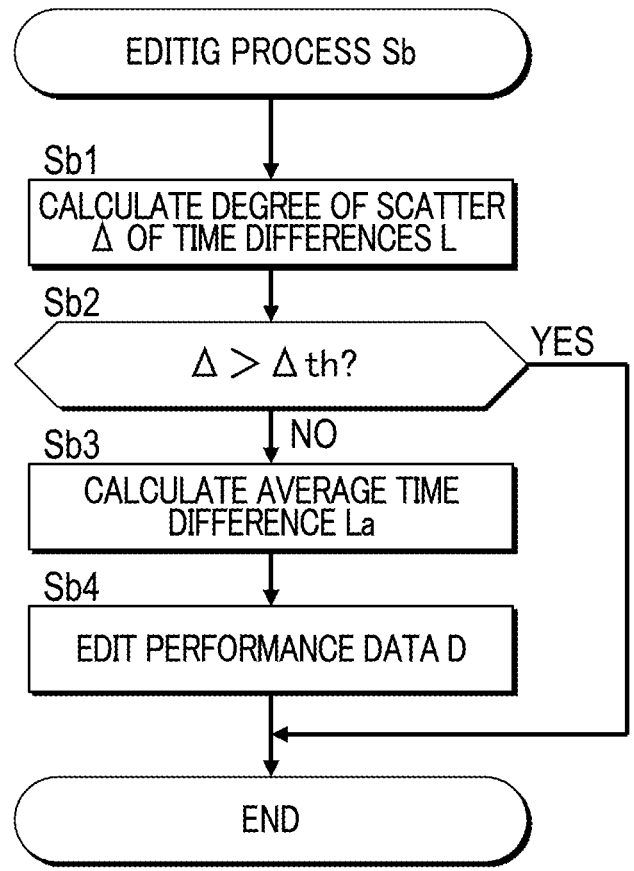
FIG. 11 is a flowchart showing a specific procedure of an editing process.

FIG. 11 is a flowchart showing a specific procedure of a process Sb executed by the editing processor 34 to edit the performance data Db (hereafter, "editing process"). In one example, the performance device 20 reproduces the reproduction part (the reproduction control process Sa described above) a predetermined number of times. The editing process Sb is executed each time the performance device 20 reproduces the reproduction control process Sa. The editing process Sb may be started upon receipt of an instruction from the user U.

When the editing process Sb starts, the editing processor 34 calculates a degree of scatter Δ of the time differences L in the reproduction control process Sa executed the predetermined number of times (Sb1). The degree of scatter Δ is a statistical value that is representative of a degree of scatter relative to the time differences L. The degree of scatter Δ may be variance of the time differences L, a standard deviation of the time differences L, a distribution range of the time differences L, or the like.

The editing processor 34 determines whether the degree of scatter Δ is greater than a threshold Δth (Sb2). When the degree of scatter Δ is greater than the threshold Δth, it is assumed that the user U is practicing the music piece and intentionally changes a waiting time from the time point of completing the reproduction of the note N1 to the time point of starting the reproduction of the note N2. Therefore, it is not appropriate to edit the performance data Db in accordance with the time differences L when the degree of scatter Δ is greater than the threshold Δth. When the degree of scatter Δ is less than the threshold Δth, it is assumed that the time differences L are numerical values that reflect the intention of the user U or the preference of the user U (that is, values particular to the user U).

Therefore, the editing processor 34 edits the performance data Db in accordance with the time differences L (Sb3 to Sb4) when the degree of scatter Δ is less than the threshold Δth (Sb2: NO). When the degree of scatter Δ is greater than or equal to the threshold Δth (Sb2: YES), the editing processor 34 terminates the editing process Sb without editing the performance data Db (Sb3 and Sb4).

To edit the performance data Db, the editing processor 34 calculates an average time difference La by averaging the time differences L (Sb3). The editing processor 34 changes the start point of the note N2 represented by the performance data Db by the average time difference La (Sb4). In one example, when the average time difference La is a negative value, the editing processor 34 moves the start point of the note N2 represented by the performance data Db backward by a time corresponding to the average time difference La. When the average time difference La is a positive value, the editing processor 34 delays the start point of the note N2 represented by the performance data Db by the time corresponding to the average time difference La. In other words, the start point of the note N2 represented by the performance data Db is delayed when the user U has a sufficient waiting time immediately before the note N2. The start point of the note N2 represented by the performance data Db is moved forward when the user U has only a short waiting time.

As will be understood from the above explanation, in the fourth embodiment, the performance data Db is edited in accordance with the time difference L in the playing of the play part by the user U. Accordingly, playing tendencies of different users U can be reflected in the performance data Db.

E: Fifth Embodiment

Figure 12:
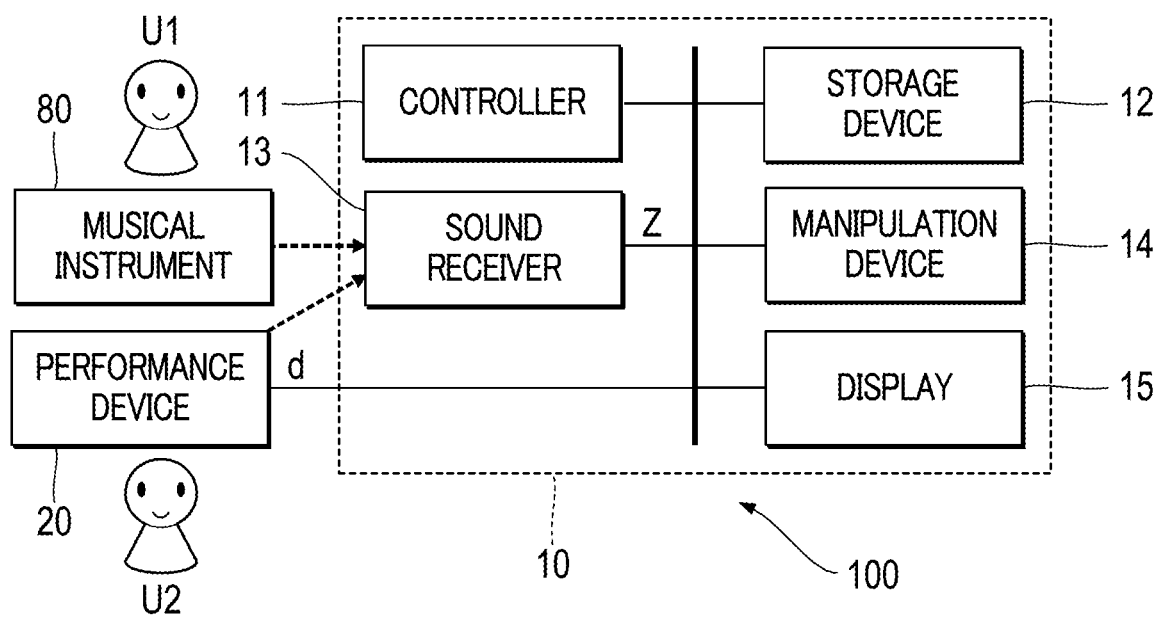
FIG. 12 is a block diagram showing an example configuration of a reproduction system according to a fifth embodiment.

FIG. 12 is a block diagram showing an example configuration of the reproduction system 100 according to a fifth embodiment. The audio processing system 10 according to the fifth embodiment includes a display 15 in addition to the same elements as those included in the audio processing system 10 according to the first embodiment (the controller 11, the storage device 12, the sound receiver 13, and the manipulation device 14). The display 15 displays images instructed by the controller 11. Examples of the display 15 include a liquid crystal display panel, and an organic EL display panel.

The musical instrument 80 is a conventional musical instrument, such as a string instrument, and is played by a user U1, as in the case of the first embodiment. In the fifth embodiment, the performance device 20 is an automatic performance instrument that functions not only as a performance device that automatically reproduces the reproduction part in the music piece but also as a musical instrument that can be played in a conventional manner, i.e., can be manually played by a user U2. Specifically, the performance device 20 includes the drive mechanism 21, and the sound emitting mechanism 22, as in the case of the performance device 20 described above.

The user U2 plays the performance device 20 by way of body movement, such as moving her/his fingers to depress and release keys on a keyboard, for example. The performance device 20 is able to generate sounds of a music piece by operating dependent on the playing of the music piece by the user U2. The performance device 20 sequentially supplies to the audio processing system 10 pieces of indication data d indicative of instructions corresponding to the playing by the user U2. The pieces of indication data d are supplied in conjunction with the playing by the user U2. The indication data d represents, for example, a pitch and a sound intensity, and specifies a motion that results in production of a sound or muting of the sound.

Figure 13:
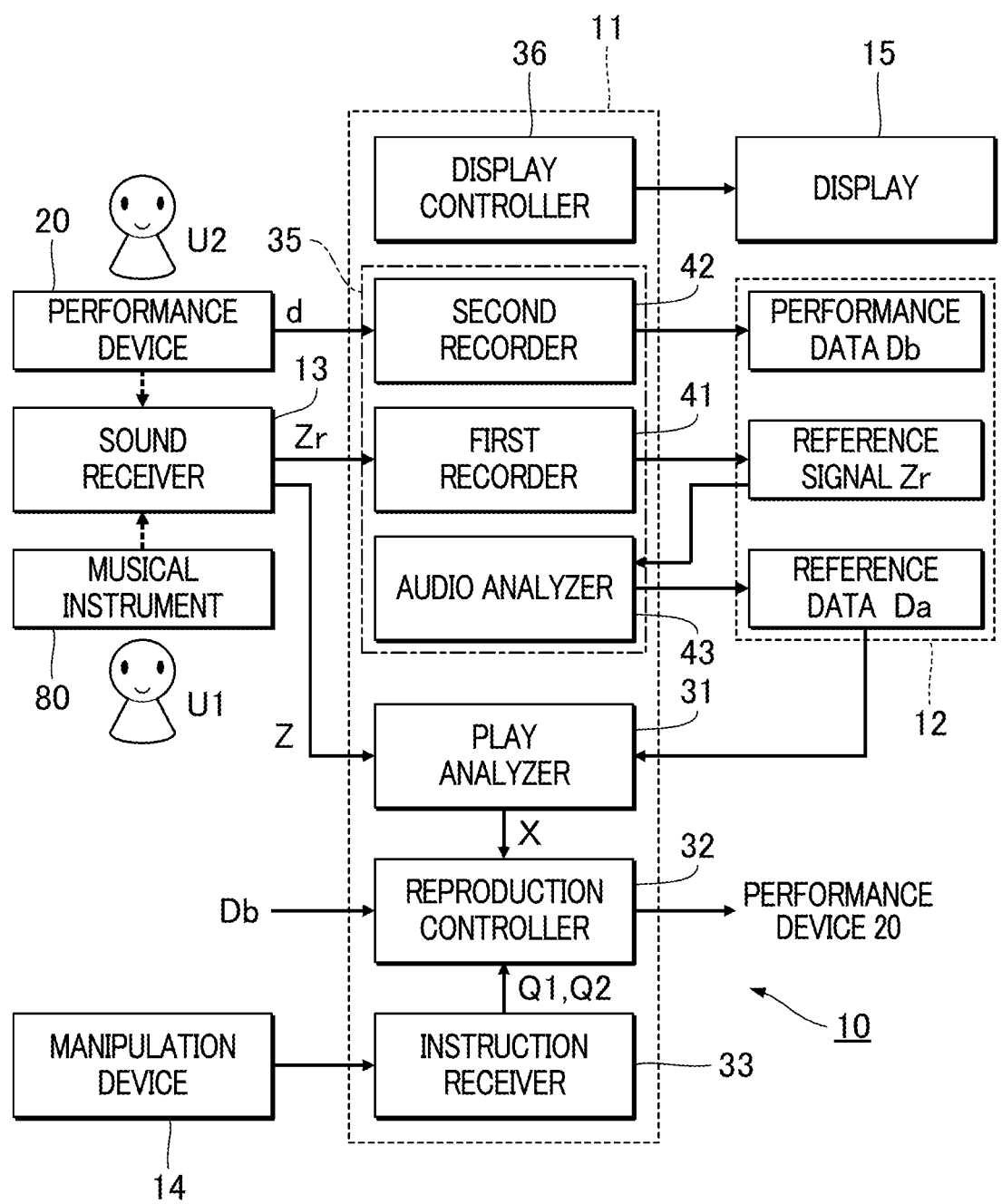
FIG. 13 is a block diagram of an example functional configuration of an audio processing system according to the fifth embodiment.

FIG. 13 is a block diagram of an example functional configuration of the audio processing system 10 according to the fifth embodiment. The controller 11 according to the fifth embodiment executes a program stored in the storage device 12, to act as a preparation processor 35 and a display controller 36, in addition to the same elements as those shown in the first embodiment (the play analyzer 31, the reproduction controller 32, and the instruction receiver 33).

The preparation processor 35 generates music data D (reference data Da and performance data Db) for use in the reproduction control process Sa. Specifically, the music data D is generated by the preparation processor 35 in accordance with both playing of the musical instrument 80 by the user U1, and playing of the performance device 20 by the user U2. The display 15 shows various images under control of the display controller 36.

The preparation processor 35 includes a first recorder 41, a second recorder 42, and an audio analyzer 43. The audio analyzer 43 generates reference data Da for use in the reproduction control process Sa. Specifically, the audio analyzer 43 generates the reference data Da by executing adjustment process Sc (see, FIG. 19) before the reproduction control process Sa is started. The reference data Da generated by the audio analyzer 43 are stored in the storage device 12.

In a period prior to the execution of the adjustment process Sc (hereafter "preparation period"), a music piece is an ensemble piece played by the users U1 and U2. Specifically, in the preparation period, the play part of the music piece is played by the user U1 with the musical instrument 80, and the reproduction part of the music piece is played by the user U2 with the performance device 20. The adjustment process Sc refers to a process for generating the reference data Da using a results of the playing of the music piece played by the users U1 and U2 in the preparation period. It is of note that the play part of the music piece may be sung by the user U1 using the sound receiver 13.

The first recorder 41 acquires an audio signal Z generated by the sound receiver 13 in the preparation period. The audio signal Z acquired by the first recorder 41 in the preparation period is referred to as "reference signal Zr," for convenience. The first recorder 41 stores the reference signal Zr in the storage device 12.

In the preparation period, the sound receiver 13 receives sounds generated by the musical instrument 80 played by the user U1 in addition to sounds generated by the performance device 20 played by the user U2. Thus, the reference signal Zr is an audio signal that includes audio components of the musical instrument 80 and audio components of the performance device 20. The musical instrument 80 is an example of "first sound source," and the performance device 20 is an example of a "second sound source." In a case where the play part is sung by the user U1, the user U1 corresponds to the "first sound source."

The second recorder 42 generates the performance data Db representative of playing of the performance device 20 in the preparation period. Specifically, the second recorder 42 generates the performance data Db based on the indication data d supplied from the performance device 20. The performance data Db is a series of MIDI format type data in which the indication data d and temporal data are arranged in a time series. The indication data d are sequentially supplied from the performance device 20 in accordance with playing of the user U2. The temporal data represent intervals between consecutive indication data d. The second recorder 42 stores the performance data Db in the storage device 12. The performance data Db stored in the storage device 12 are used in the reproduction control process Sa, as described above. The performance data Db acquired by the second recorder 42 may be edited by the editing processor 34 according to the fourth embodiment.

As will be understood from the above description, in the preparation period, the reference signal Zr and the performance data Db are stored in the storage device 12. The audio analyzer 43 generates reference data Da by using adjustment process Sc, which uses the reference signal Zr acquired by the first recorder 41 and the performance data Db acquired by the second recorder 42.

Figure 14:
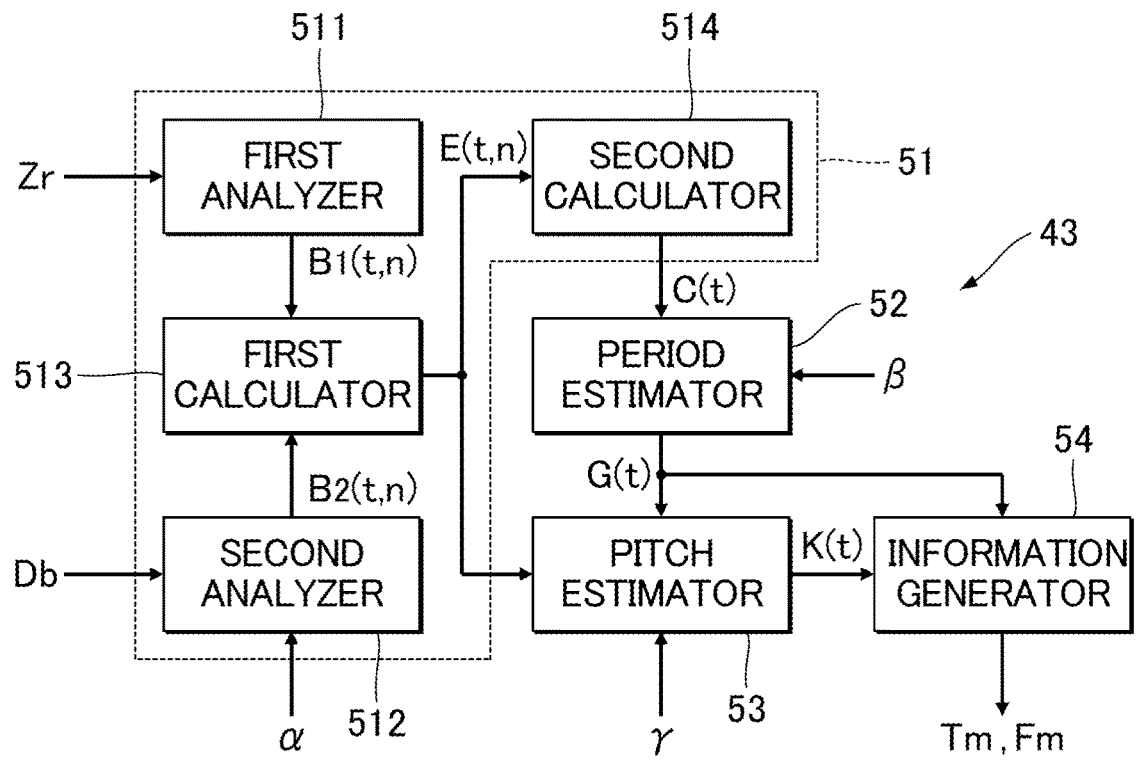
FIG. 14 is a block diagram showing an example of a specific configuration of an audio analyzer.

FIG. 14 is a block diagram showing an example of a specific configuration of the audio analyzer 43. As shown in FIG. 14, the audio analyzer 43 includes an indicator calculator 51, a period estimator 52, a pitch estimator 53, and an information generator 54. The manipulation device 14 according to the fifth embodiment receives, from the user U (U1 or U2), instructions relating to values of variables ($\alpha$, $\beta$, $\gamma$), to which the adjustment process Sc is applied. The values of the variables can be set and can be changed by the user U who operates the manipulation device 14.

Indicator Calculator 51

The indicator calculator 51 calculates a series of sound indicators C(t), each of which corresponds to a different time point on the time axis. The "t" is a time point on the time axis. Each sound indicator C(t) represents certainty (likelihood or probability) that audio components of the musical instrument 80 are included in the reference signal Zr. In other words, the higher certainty that the audio components of the musical instrument 80 are included in the reference signal Zr at a time point t on the time axis causes the larger sound indicators C(t) to be set. The indicator calculator 51 according to the fifth embodiment includes a first analyzer 511, a second analyzer 512, a first calculator 513, and a second calculator 514.

The first analyzer 511 analyzes the reference signal Zr to calculate, for each time point t, N first indicators B1($t$, 1) to B1($t$, N), each of which corresponds to a different pitch Pn. Here, "n" is any one of N pitches P1 to PN (n=1 to N). In other words, the first analyzer 511 calculates a series of first indicators B1($t$, n).

Each of the first indicators B1($t$, n) correspond to a pitch Pn and represents a certainty that audio components of the pitch Pn of the performance device 20 or of the musical instrument 80 are included in the reference signal Zr, and is set to a value from 0 to 1 (0≤B1($t$, n)≤1). The larger the intensities of the audio components of the pitch Pn, the larger the first indicators B1($t$, n) are set. The pitch Pn referred to here is a pitch for one or both of the performance device 20 and the musical instrument 80. As will be understood from the above description, the first indicators B1($t$, n) are each an indicator that relate to intensities of the components of the reference signal Zr, specifically, are each an indicator that relate to intensities of the audio components of a corresponding pitch Pn. Any known audio analysis technique (in particular, a pitch estimation technique) may be employed to calculate the first indicators B1($t$, n) using the first analyzer 511.

The second analyzer 512 analyzes the performance data Db, to calculate, for each time point t on the time axis, N second indicators B2($t$,1) to B2($t$, N), each of which corresponds to a different pitch Pn. In other words, the second analyzer 512 calculates a series of second indicators B2($t$, n).

Each of the second indicators B2($t$, n) corresponds to a pitch Pn and represents a sound intensity of a pitch Pn of a note at a time point t, and is set to a value from 0 to 1 (0≤B1($t$, n)≤1). The sound intensity is represented by the performance data Db. The larger the sound intensity represented by the performance data Db, the larger the second indicators B2($t$, n). When a note of a pitch Pn at time point t is not found, one of the second indicators B2($t$, n) corresponding to the pitch Pn is set to zero.

To calculate each of the second indicators B2($t$, n), a variable $\alpha$ is used. The variable $\alpha$ is set in response to an instruction from the user U. In one example, the second analyzer 512 calculates each of the second indicators B2($t$, n) using the following Formula (1).

$$B2(t,n)=1-\exp\{-c \cdot v(t,n) \cdot \alpha\} \quad (1)$$

In Formula (1), "v(t, n)" has a value that corresponds to a sound intensity of the pitch Pn at time point t on the time axis. When the time point t on the time axis is within a sounding period of a note of a pitch Pn, the performance data Db is used for setting the sound intensity of the pitch Pn of the note. The intensity v(t, n) is set to the sound intensity of the pitch Pn. When the time point t on the time axis is not within the sounding period of the pitch Pn, the intensity v(t, n) is set to zero. In Formula (1), "c" is a coefficient, and is set to a predetermined positive number.

As will be apparent from Formula (1), when the variable $\alpha$ is small, each of the second indicators B2($t$, n) is set to be small, even when the intensity v(t, n) is large. When the variable $\alpha$ is large, each of the second indicators B2($t$, n) is set to be large, even when the intensity v(t, n) is smaller. Thus, the smaller the variable $\alpha$, the smaller the second indicators B2($t$, n) tend to be.

As shown in FIG. 14, the first calculator 513 calculates sound indicators E(t, n) by subtracting the second indicators B2($t$, n) from respective first indicators B1($t$, n). Each sound indicator E(t, n) represents a certainty (likelihood or probability) that audio components of a pitch Pn generated by the musical instrument 80 are included in the reference signal Zr at time point t. Specifically, the first calculator 513 calculates each sound indicator E(t, n) using the following Formula (2).

$$E(t,n)=\max\{0, B1(t,n)-B2(t,n)\} \quad (2)$$

In Formula (2), the "max {a, b}" represents numerical calculations of selecting values "a" and "b", whichever is larger. As will be clear from Formula (2), each sound indicator E(t, n) has a value from 0 to 1 (0≤B1($t$, n)≤1). The larger the intensities of the audio components of the pitch Pn generated by the musical instrument 80, the larger sound indicators E(t, n) are set. Each sound indicator E(t, n) is referred to as an indicator that relates to an intensity of audio components (a pitch Pn) of the musical instrument 80 included in the reference signal Zr.

The first indicators B1($t$, n) are dependent on audio components of both the performance device 20 and the musical instrument 80. In contrast, the second indicators B2($t$, n) are dependent only on audio components of the performance device 20. Accordingly, in the numerical calculations shown in Formula (2), subtraction of the second indicators B2($t$, n) from the first indicators B1($t$, n) results in a reduction in dependence of the audio components of the performance device 20 on the first indicators B1($t$, n). Each of the sound indicators E(t, n) on the time point t corresponds to an indicator relating to the intensities of the audio components (a pitch Pn) of the musical instrument 80 from among the audio components included in the reference signal Zr. As shown in the aforementioned Formula (1), the larger the variable $\alpha$, the larger the second indicators B2($t$, n) tend to be. Thus, the variable $\alpha$ is a variable that controls an amount of reduction of dependence of the audio components of the performance device 20 on the first indicators B1($t$, n). The larger the variable $\alpha$ (the second indicators B2($t$, n), the smaller the dependence of the audio components of the performance device 20 on the first indicators B1($t, n$) in the sound indicator E(t, n).

The second calculator 514 calculates, for each time point t, a sound indicator C(t) from the sound indicator E(t, n) calculated by the first calculator 513. Specifically, the second calculator 514 calculates each sound indicator C(t) by using the following Formula (3).

$$C(t)=\max\{E(t,1),E(t,2), \ldots ,E(t,N)\} \quad (3)$$

As will be apparent from Formula (3), N sound indicators E(t, 1) to E(t, N) each correspond to a different pitch Pn, and the maximum value thereof is selected as the sound indicator C(t) at time point t. As will also be understood from the above description, audio components of the musical instrument 80 may correspond to any of the N pitches P1 to PN. Each sound indicator C(t) represents a certainty that the audio components are included in the reference signal Zr. The larger the variable α (the larger second indicators B2($t, n$)), the smaller the dependence of the audio components of the performance device 20 on the sound indicators C(t). The sound indicators C(t) have a smaller value in a period during which the acoustic components of the performance device 20 are predominant. In contrast, in a period during which the audio components are not present, the sound indicators C(t) change less even when the variable α changes.

Period Estimator 52

In FIG. 14, the period estimator 52 estimates a performance period. The performance period refers to a time period during which audio components of the musical instrument 80 are present on the time axis. Specifically, the period estimator 52 calculates a sound indicator G(t) for each time point t, using the sound indicator C(t) calculated by the indicator calculator 51. Each sound indicator G(t) represents whether audio components of the musical instrument 80 are present (sound/silence) at time point t. When the audio components of the musical instrument 80 are present, each sound indicator G(t) is set to a value g1 (e.g., g1=1). Otherwise, each sound indicator G(t) is set to a value g0 (e.g., g0=0).

At one or more time points t, each sound indicator G(t) has the value g1. One ore more time points t constitute one period, and this period corresponds to the performance period. The performance period is an example of a "sounding period."

The first Hidden Markov Model (HMM) is used to estimate the performance period. The first HMM is a state transition model that has two states, one of which is a sound state that corresponds to sound (the value g1), and the other of which is a silence state that corresponds to silence (the value g0). Specifically, the period estimator 52 uses Viterbi search to calculate, as each sound indicator G(t), a series of maximum likelihood states generated by the first HMM.

Probability Λ (referred to as "sound probability") that the sound state occurs in the first HMM is defined by the following Formula (4). In Formula (4), "σ" is a sigmoid function. The probability that the silence state occurs is (1−Λ). The probability that the sound state or the silence state is maintained between two consecutive time points t on the time axis is set to a predetermined constant (e.g., 0.9).

$$\Lambda=\sigma\{C(t)-\beta\} \quad (4)$$

As will be apparent from Formula (4), a variable β is used for the calculation of the sound probability Λ. The variable β is set in response to an instruction from the user U. Specifically, the larger the variable β, the smaller the sound probability Λ is set. Accordingly, the larger variable β, the greater the tendency for the sound indicators G(t) to be set to the value g0, and as a result, the performance period tends to be shorter.

In contrast, the smaller the variable β, the larger the sound probability Λ is set. Accordingly, each sound indicator G(t) tends to be set to the value g1, and as a result, the performance period tends to be longer.

As described in the aforementioned Formula (3), the larger the variable α, the smaller the sound indicators C(t) within the period during which audio components of the performance device 20 are predominant. As will be apparent from Formula (4), the smaller sound indicators C(t) cause the smaller sound probability Λ to be set. Accordingly, the larger the variable α, the greater the tendency for the sound indicators G(t) to be set to the value g0, and as a result, the performance period tends to be shorter. As will be understood from the above description, the variable α is dependent on not only the sound indicators C(t) but also on the performance period. That is, the variable α is dependent of both the sound indicators C(t) and the sound indicators G(t), while the variable β is dependent on only the sound indicators G(t).

Pitch Estimator 53

The pitch estimator 53 identifies a series of pitches K(t) of the musical instrument 80. Each pitch K(t) corresponds to a different time point t on the time axis, and can be set to any of the N pitches P1 to PN.

A second HMM is used to estimate each pitch K(t). The second HMM is a state transition model having N states, each of which corresponds to a different pitch Pn. A probability density function ρ(x|μn, κn) of an observation probability x of a pitch Pn is expressed by Von Mises-Fisher distribution, and is defined by the following Formula (5).

$$\rho(x|\mu_n,\kappa_n) \propto \exp\{\kappa_n x^T \mu_n /(\|x\|\|\mu_n\|)\} \quad (5)$$

In formula (5), "T" is a transpose of a matrix, and "|| ||" is a norm; "μn" is a position parameter, and "κn" is a concentration parameter. The position parameter μn and the concentration parameter κn are set by machine learning using the sound indicators E(t, n).

In the second HMM, a transition probability λ(n1, n2) from a pitch Pn1 to a pitch Pn2 is defined by the following Formula (6). Where, n1=1 to N, n2=1 to N, and n1≠n2. By using Formula (6), the transition probability λ(n1, n2) is obtained for all combinations of selecting two notes Pn(Pn1, Pn2) from N notes P1-PN.

$$\lambda(n1,n2)=\{I+\gamma\cdot\tau(n1,n2)\}/(1+\gamma) \quad (6)$$

In Formula (6), "I" is an n-dimensional unit matrix; and "τ(n1,n2)" is a probability of transition from a pitch Pn1 to a pitch Pn2, and is set by machine learning using known musical scores. At time point t at which a sound indicator G(t) has the value g0 (silence), the transition probability from the pitch Pn1 to the pitch Pn2 is set to a unit matrix I, and the observation probability x is set to a predetermined constant.

As will be apparent from Formula (6), the variable γ, which is set in response to an instruction from the user U, is used for estimation of each pitch K(t). Specifically, the smaller the variable γ, the closer the transition probability λ(n1, n2) to the unit matrix I, and thus transition from the pitch Pn1 to the pitch Pn2 is less likely to occur. In contrast, the larger the variable γ, the more predominant the transition probability τ(n1, n2), and thus the influence of the transition probability τ(n1, n2) on the transition probability λ(n1, n2) increases. Accordingly, the larger variable γ, the higher the transition probability λ(n1, n2). Accordingly, the larger the variable γ, the more likely it is that a transition from the pitch Pn1 to the pitch Pn2 will occur.

Information Generator 54.

The information generator 54 identifies (i) M sound points T1 to TM (any sound point is denoted by "Tm") on the time axis, and (ii) M pitches F1 to FM (any pitch can be denoted by "Fm") at the respective M sound points T1 to TM. The number M of the sound points Tm in the music piece is variable. Specifically, the information generator 54 identifies on the time axis a time point t at which a pitch K(t) changes within a performance period that satisfies the sound indicator G(t) as the value g1. Further, the information generator 54 identifies a pitch K(tm) at the sound point Tm, as a pitch Fm, for each time point t.

As described in the aforementioned Formula (6), the smaller the variable γ, the less likely it is that a transition of a pitch Pn will occur. Thus, the number M of the sound points Tm are decreased, and the number M of the pitches Fm are also decreased. In contrast, the larger variable γ, the more likely it is that transition of a pitch Pn will occur. Thus, the numbers M of the sound points Tm are increased, and the numbers M of the pitches Fm are increased. The variable γ refers to a parameter for controlling the numbers M of the sound points Tm and the pitches Fm.

The information generator 54 stores reference data Da in the storage device 12. The reference data Da includes (i) the sound indicators E(t, n) calculated by the indicator calculator 51 (the second calculator 514), (ii) the sound points Tm on the time axis, and (iii) the sounded indicators G(t) calculated by the period estimator 52.

Figure 15:
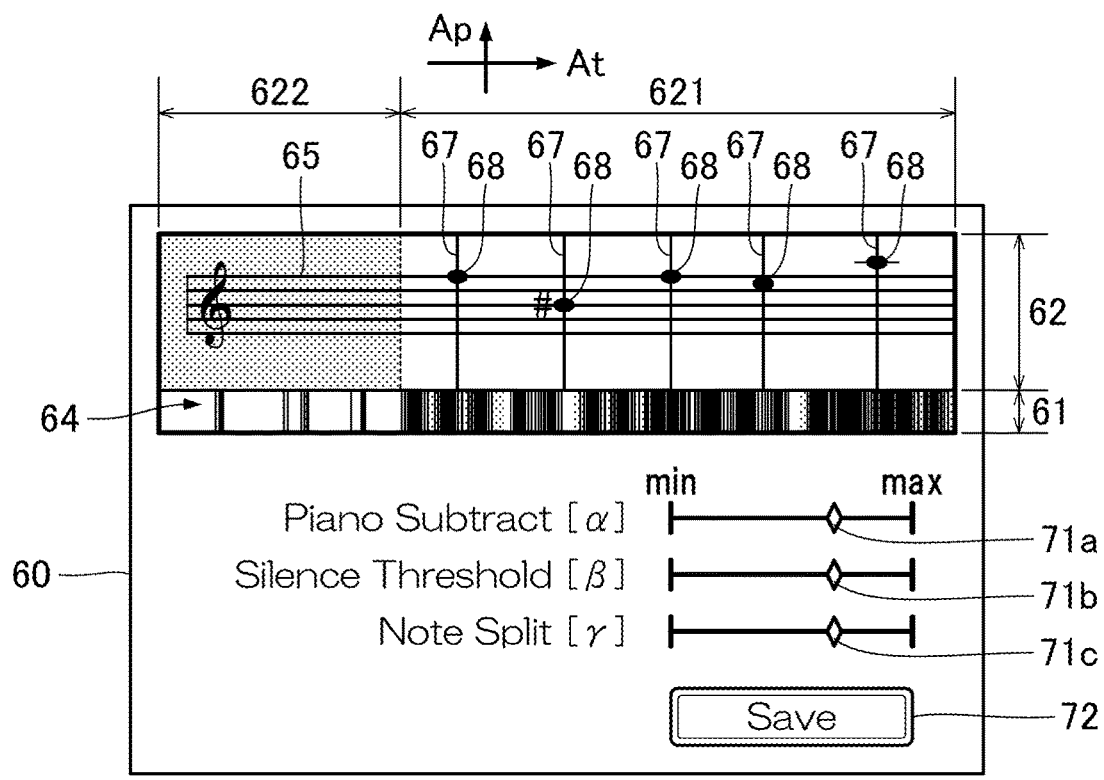
FIG. 15 is a schematic diagram of a confirmation screen.

Under control of the display controller 36 shown in FIG. 13, results of the analysis made by the audio analyzer 43 are shown on the display 15. Specifically, under control of the display controller 36, the confirmation screen 60 shown in FIG. 15 is shown on the display 15. The confirmation screen 60 is an image that enable the user U to confirm the results of the analysis made by the audio analyzer 43.

The confirmation screen 60 includes a first area 61 and a second area 62. The first area 61 and the second area 62 have a common time axis At. The time axis At extends in the horizontal direction. The time axis At may be displayed as an image that that can be viewed by the user U, or may not be displayed on the confirmation screen 60. The section of the music piece shown on the confirmation screen 60 is changed in response to instructions (e.g., zoom in/zoom out) provided by the user U to the manipulation device 14.

In the second area 62, a visual appearance of how the performance period 621 is displayed on the time axis At differs from that from how the non-performance period 622 (the period other than the performance period 621) is displayed. In one example, the performance period 621 and the non-performance period 622 are each displayed in a different color. In the performance period 621, each sound indicator G(t) is set to the value g1 on the time axis At. In contrast, in the non-performance period 622, each sound indicator G(t) is set to the value g0 on the time axis At. As will be understood from the above description, on the confirmation screen 60 there is displayed the performance period 621 estimated by the period estimator 52.

A transition image 64 is displayed in the first area 61. The transition image 64 represents a series of sound indicators C(t) calculated by the indicator calculator 51 along the time axis At. Specifically, in the transition image 64, portions, each of which corresponds to a time point t on the time axis At, are displayed with a visual appearance that accords with the sound indicators C(t). The term "visual appearance" refers to the properties of an image visually distinguishable by an observer. Examples of concepts of the term "visual appearance" include a pattern, a shape, as well as three attributes of color: hue (tone), saturation, and lightness (scale). In one example, in the transition image 64, the shading of the scale of portions, each of which corresponds to a time point t, is controlled in accordance with the sound indicators C(t). Specifically, in the transition image 64, portions, each of which corresponds to a time point t at which the sound indicator C(t) is larger, is displayed in a dark tone. In the transition image 64, portions, each of which corresponds to a time point t at which the sound indicator C(t) is smaller, is displayed in a light tone.

In the second area 62 there are displayed a staff notation 65, instruction images 67, and note images 68. The staff notation 65 is composed of five straight lines parallel to the time axis At, and each line represents a different pitch. That is, in the second area 62 a pitch axis Ap is set that represents pitches, and extends vertically orthogonal to the time axis At. The pitch axis Ap may be displayed as an image visible to the user U, or it may not be displayed on the confirmation screen 60.

Each instruction image 67 represents one sound point Tm generated by the information generator 54. That is, the instruction images 67 represent a series of sound points Tm. Specifically, each instruction image 67 that corresponds to a sound point Tm is indicated by a vertical line arranged at a position that corresponds to the sound point Tm on the time axis At. On the time axis At the instruction images 67 are arranged, each of which corresponds to a different sound point Tm.

Each note image 68 represents one pitch Fm generated by the information generator 54. An example of each note image 68 is a note head. The series of the pitches Fm are represented by the note images 68. The pitches Fm are set for each sound point Tm, and the note images 68 are arranged for each sound point Tm (i.e., for each sound image 67). Specifically, in the direction of the time axis At, a note image 68 representative of a pitch Fm at a sound point Tm is arranged on the line of the instruction image 67 representative of the sound point Tm. Further, in the direction of the pitch axis Ap, the note images 68, each of which represents a pitch Fm, is arranged at a position that corresponds to the pitch Fm. In other words, each note image 68 is arranged at a position that overlaps or is closer to the staff notation 65.

As described above, on the confirmation screen 60 there are displayed the following (i) to (iii) by use of the common time axis At: (i) the series of the sound indicators C(t) (i.e., the transition image 64); (ii) the series of the sound points Tm (i.e., the instruction images 67); and (iii) the series of the pitches Fm (i.e., the note images 68). This display arrangement enables the user U to visually and intuitively confirm temporal relations among the sound indicators C(t), the sound points Tm, and the pitches Fm.

The confirmation screen 60 includes operation images 71 (71a, 71b, 71c) and an operation images 72. Each operation image 71 represents a slider (an input operator) that is operated by the user U using the manipulation device 14. Specifically, the slider represented by the operation image 71a receives, from the user U, instructions to change the variable α. The slider represented by the operation image 71b receives, from the user U, instructions to change the variable β. The slider represented by the operation image 71c receives, from the user U, instructions to change the variable γ.

Figure 16:
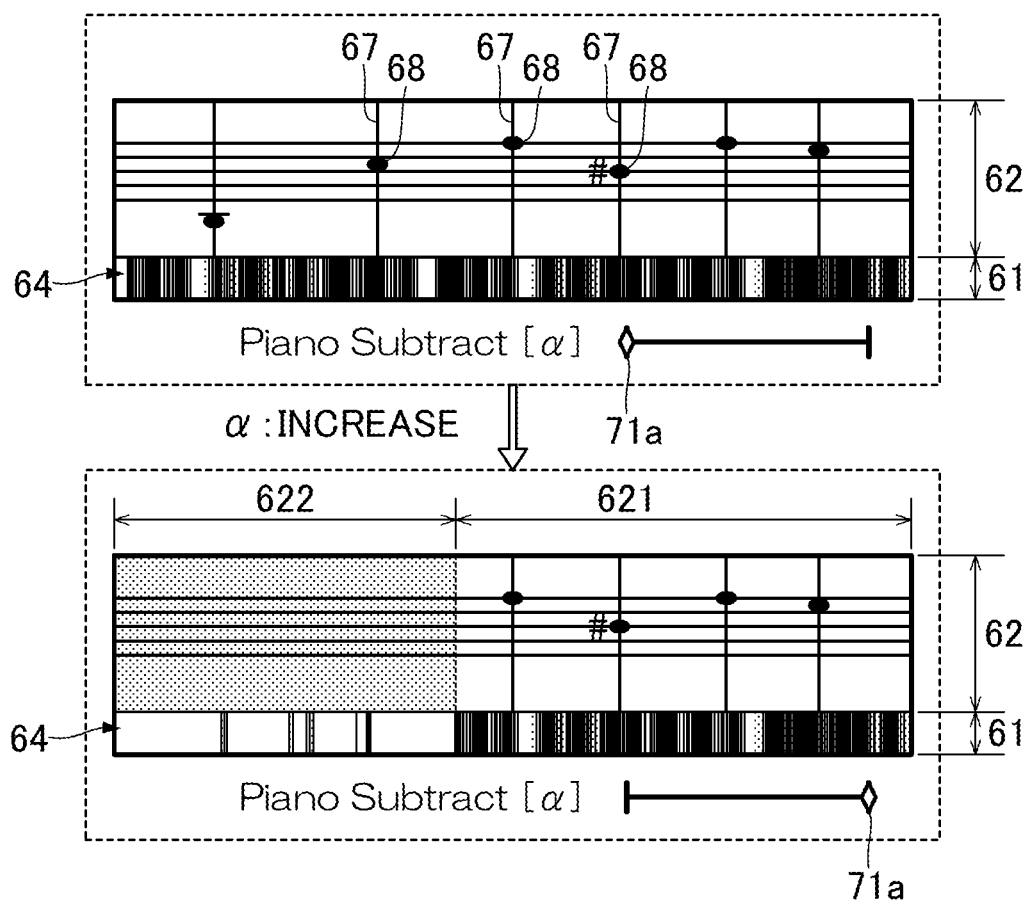
FIG. 16 is a schematic diagram showing how the confirmation screen is changed.

The indicator calculator 51 (the second analyzer 512) changes the variable α in response to an instruction from the user U that is imparted by way of the operation image 71a. The indicator calculator 51 calculates the sound indicators C(t) by a numerical calculation to which the changed variable α is applied. The display controller 36 updates the transition image 64 on the confirmation screen 60, for each calculation of a sound indicator C(t). As described in the aforementioned Formula (3), the larger the variable α, the smaller the sound indicators C(t) that are set within the period during which audio components of the performance device 20 are predominant. As a result, the sound indicators G(t) tend to be set to the value g0. Accordingly, as shown in FIG. 16, as the variable α is larger, in the transition image 64, the tones in this period changes to a lighter tone, and the non-performance period 622 is longer. While checking the confirmation screen 60, the user U operates the slider represented by the operation image 71a such that the performance period 621 approaches the real performance period.

Figure 17:
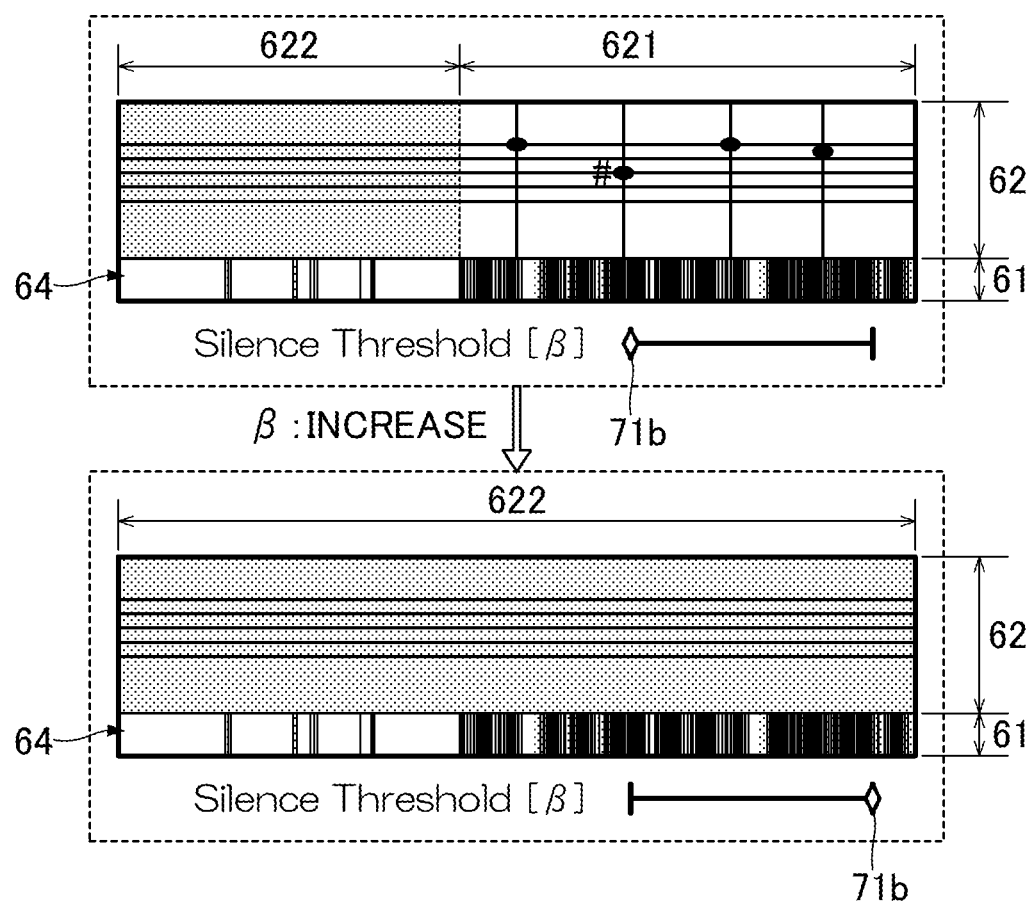
FIG. 17 is a schematic diagram showing how the confirmation screen is changed.

The period estimator 52 changes the variable β in response to an instruction from the user U that is imparted by way of the operation image 71b. The period estimator 52 calculates the sounded probability Λ by a numerical calculation to which the changed variable β is applied. The display controller 36 updates the performance period 621 on the confirmation screen 60, for each calculation of the sound probability Λ. As described in the aforementioned Formula (4), the larger variable β, the more likely it is that the sound indicators G(t) will be set to the value g0. Accordingly, as shown in FIG. 17, the larger variable β, the longer the non-performance period 622. Similar to the case of the adjustment of the variable α, while checking the confirmation screen 60, the user U operates the slider represented by the operation image 71b such that the performance period 621 approaches the real performance period.

Figure 18:
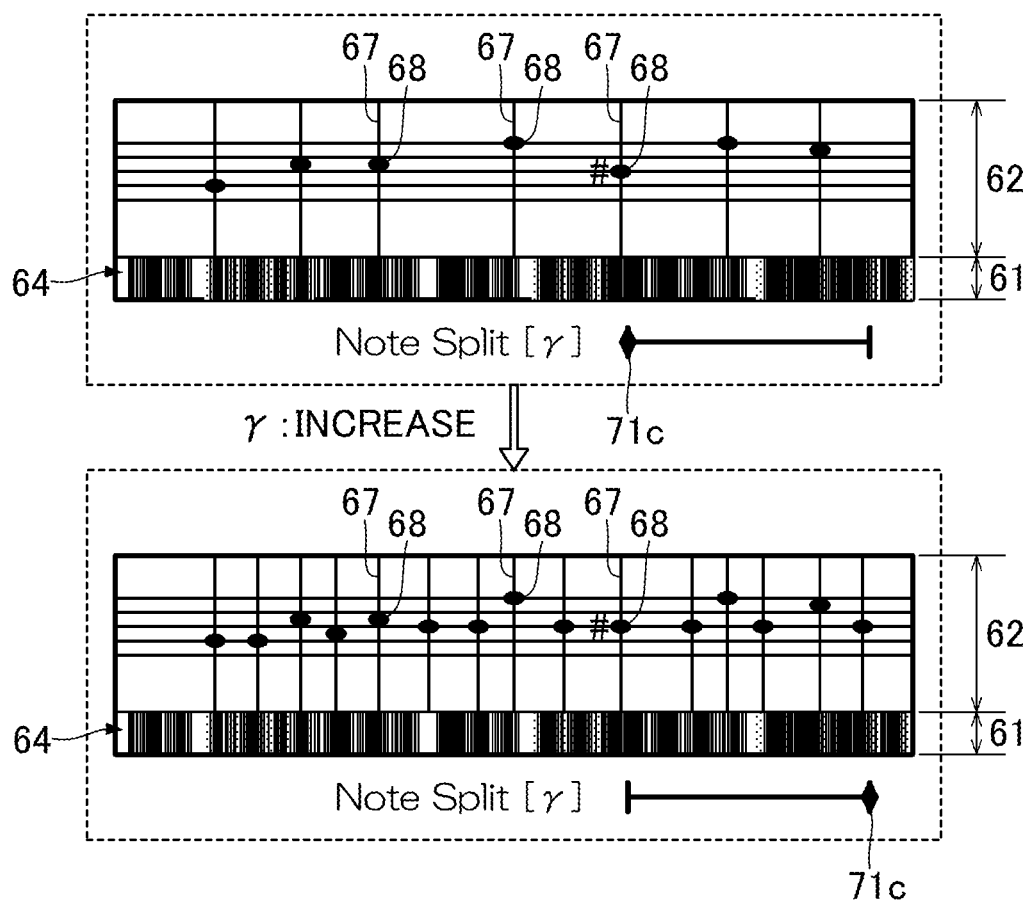
FIG. 18 is a schematic diagram showing how the confirmation screen is changed.

The pitch estimator 53 changes the variable γ in response to an instruction from the user U that is imparted by way of the operation image 71c. The pitch estimator 53 calculates the transition probability λ(n1, n2) by a numerical calculation to which the changed variable γ is applied. The display controller 36 updates the instruction images 67 and the note images 68 on the confirmation screen 60, for each calculation of the transition probability λ(n1, n2). As described in the aforementioned Formula (6), the larger the variable γ, the larger the transition probability λ(n1, n2). Accordingly, as shown in FIG. 18, as the variable γ increases, the number of the instruction images 67 (the sound points Tm) and the number of the note images 68 (the pitches Fm) increase.

While checking the confirmation screen 60, the user U operates the slider represented by the operation image 71c such that play content of user U1 in the preparation period reaches the numbers of the instruction images 67 and the note images 68.

The operation image 72 represents a button for input of instructions received from the user U to save the reference data Da. The information generator 54 stores in the storage device 12 content of the analysis (the sound indicators E(t, n), sound points Tm, and the sound indicators G(t)) at a time at which the slider represented by the operation image 72 is operated. The content of the analysis stored in the storage device 12 is used as the reference data Da.

Figure 19:
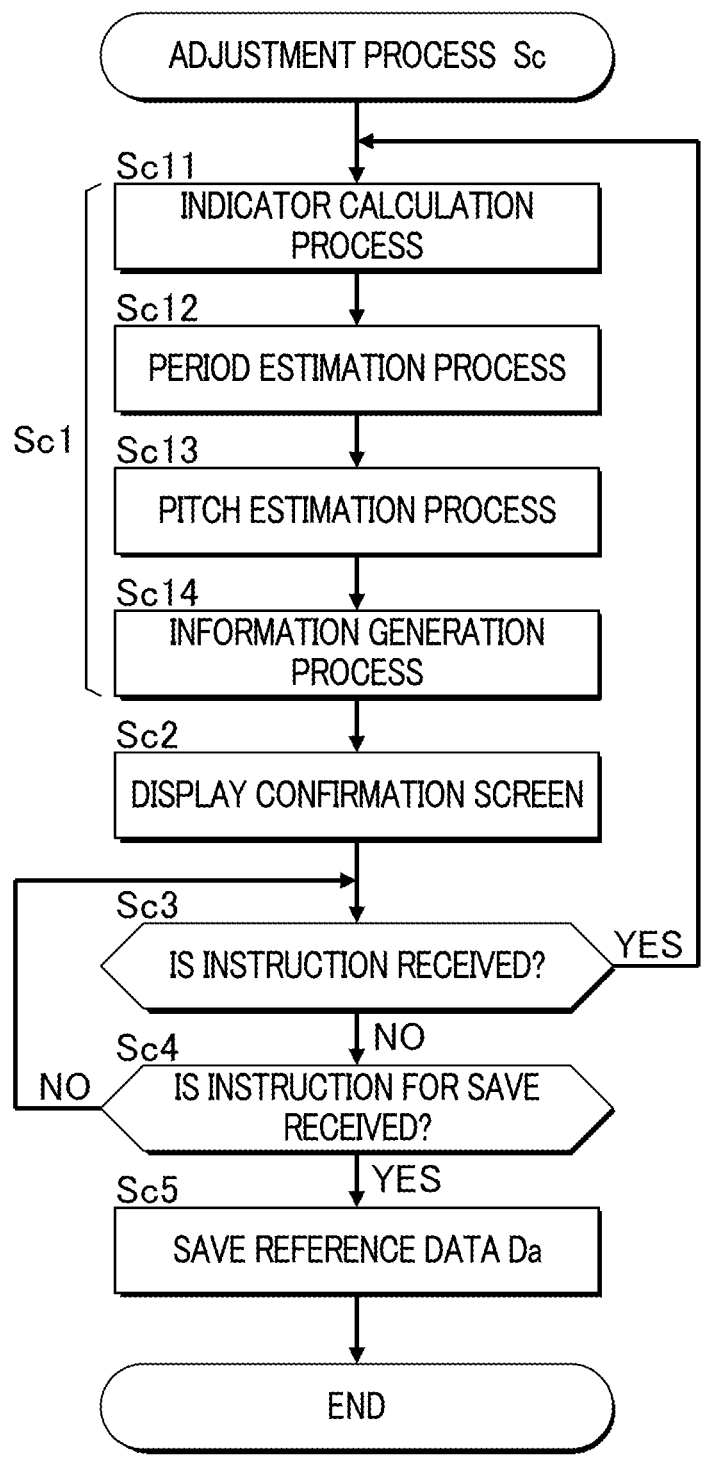
FIG. 19 is a flowchart showing an example of a specific procedure of an adjustment process.

FIG. 19 is a flowchart showing an example of specific procedure of the adjustment process Sc. In one example, after the performance data Db and the reference signal Zr are acquired in the preparation period, the adjustment process Sc is started upon receipt of an instruction from the user U that is made to the manipulation device 14.

When the adjustment process Sc is started, an analysis process Sc1 is executed by the audio analyzer 43. The analysis process Sc1 is a process for analyzing a reference signal Zr, and includes an indicator calculation process Sc11, a period estimation process Sc12, a pitch estimation process Sc13, and an information generator process Sc14. The indicator calculation process Sc11 is an example of "identifying a series of sound indicators," the period estimation process Sc12 is an example of "identifying a sound period. The variable α is an example of a "first variable," the variable β is an example of a "second variable," and the variable γ is an example of a "third variable."

The indicator calculator 51 calculates the sound indicators C(t) using the performance data Db and the reference signal Zr (the indicator calculation process Sc11). The indicator calculation process Sc11 includes (i) a calculation of the first indicators B1(t, n) using the first analyzer 511, (ii) a calculation of the second indicators B2(t, n) using the second analyzer 512, (iii) a calculation of the sound indicators E(t, n) using the first calculator 513, and (iv) a calculation of the sound indicators C(t) using the second calculator 514. The variable α, which is set in response to an instruction from the user U, is used in the indicator calculation process Sc11.

The period estimator 52 calculates the sound indicators G(t) by using the sound indicators C(t), to estimate a performance period 621 (the period estimation process Sc12). The variable β, which is set in response to an instruction from the user U, is used for the period estimation process Sc12. The pitch estimator 53 estimates the pitches K(t) of audio components of the musical instrument 80 (the pitch estimation process Sc13). The variable γ, which is set in response to an instruction from the user U, is used for the pitch estimation process Sc13. Then, the information generator 54 identifies sound points Tm on the time axis, and sound pitches Fm of the respective sound points Tm (the information generation process Sc4).

Under control of the display controller 36, the display 15 shows a confirmation screen 60 representative of a result of the analysis process Sc1 (Sc2). Specifically, on the confirmation screen 60 there are displayed the following images: (i) a performance period 621 on the time axis At, (ii) a transition image 64 representative of sound indicators C(t), (iii) instruction images 67 representative of sound points Tm, and (iv) note images 68 representative of pitches Fm.

The audio analyzer 43 determines whether a slider represented by any of operation images 71 (71a, 71b or 71c) has been operated (Sc3). That is, it is determined whether a change of any of the variables (α, β or γ) has been instructed by the user U. When a slider represented by any of the operation images 71 is operated (Sc3: YES), the audio analyzer 43 executes (i) the analysis process Sc1 to which the changed variable (α, β or γ) is applied, and (ii) updates the confirmation screen 60 based on a result of the analysis process Sc1 (Sc2). The calculation of the first indicators B1 (t, n) using the first analyzer 511 may be executed once in the indicator calculation process Sc11 immediately after the start of the analysis process Sc1.

When a slider represented by any of the operation images 71 is not operated (Sc3: NO), the audio analyzer 43 determines whether the button represented by the operation image 72 has been operated (Sc4). That is, it is determined whether a determination of the reference data Da has been instructed by the user U. When the button represented by the operation image 72 is not operated (Sc4: NO), the audio analyzer 43 moves the process to step Sc3. When the button is operated (Sc4: YES), at this time the information generator 54 stores in the storage device 12 a result of the analysis process Sc1 (the sound indicators E(t, n), sound points Tm and the sound indicators G(t)) (Sc5). The storing of reference data Da, which is the result of the analysis process Sc1, ends the adjustment process Sc.

To summarize, in the fifth embodiment, there are displayed a series of the sound indicators C(t) (the transition image 64), and a series of the pitches Fm (the note images 68) by use of the common time axis At. This display enables the user U to easily confirm and correct the analysis results of the reference signal Zr during the process of generating the reference data Da. The display enables the user U to visually and easily confirm relations between the sound indicators C(t) and the pitches Fm.

In the fifth embodiment, to calculate the sound indicators C(t), the second indicators B2(t, n) calculated by analyzing the performance data Db are subtracted from the first indicators B1(t, n) calculated by analyzing the reference signal Zr. In the sound indicators C(t) obtained by this subtraction, the dependence of the audio components of the performance device 20 on the first indicators B1(t, n) is reduced. In other words, this subtraction makes it possible to calculate the sound indicators C(t) in which the audio components of the musical instrument 80 are emphasized.

Further, the variable $\alpha$, which is set in response to an instruction from the user U, is used to calculate the second indicators B2(t, n). Thus, the user U is able to adjust the sound indicators C(t) to conform to the performance of the musical instrument 80 in the preparation period.

In the fifth embodiment, there are displayed a series of the sound indicators C(t) (the transition image 64) and a series of the pitches Fm (the note images 68) as well as the performance period 621, by use of the common time axis At. This display enables the user U to visually and easily confirm temporal relations among (i) the sound indicators C(t), (ii) the pitches Fm, and (iii) the performance period 621.

Further, the variable $\beta$, which is set in response to an instruction from the user U, is used for the period estimation process Sc12. The user U is able to adjust the performance period 621 to conform to the performance of the musical instrument 80 in the preparation period.

In the fifth embodiment, there are displayed a series of the sound indicators C(t) (the transition image 64), and a series of the pitches Fm (the note images 68) as well as a series of the sound points Tm (the indication images 67), by way of the common time axis At. This display enables the user U to visually and intuitively confirm temporal relations among (i) the sound indicators C(t), (ii) the pitches Fm, and (iii) the sound points Tm.

Further the variable $\gamma$, which is set in response to an instruction from the user U, is used for the pitch estimation process Sc13. Thus, the user U is able to adjust the sound points Tm to conform to the performance of the musical instrument 80 in the preparation period.

F: Modifications

Examples of specific modifications that are appended to the foregoing embodiment will now be described. Two or more modifications optionally selected from the following examples may be appropriately combined so long as they do not conflict with each other.

(1) In each embodiment described above, the instruction receiver 33 receives the manipulation of shifting the manipulation device 14 from the released state to the depressed state as the first instruction Q1. However, a mode of the first instruction Q1 is not limited to the example described above. In one example, another motion performed by the user U may be received as the first instruction Q1. To receive the motion performed by the user U, various types of detectors may be used such as a camera, an accelerometer and so forth. The instruction receiver 33 may determine, as the first instruction Q1, various motions such as a motion of the user U in raising one hand, a motion of elevating the musical instrument 80, and a breathing motion (for example, an inhaling motion). Breathing of the user U is a breath (intake of breath) taken when a wind instrument is played as the musical instrument 80. The manipulation velocity V1 in the second embodiment is comprehensively represented as a velocity of a motion of the user U determined as the first instruction Q1.

Specific data denoting the first instruction Q1 (hereafter, "first data") may be included in the performance data Db. The first data is, for example, a rest fermata symbol included in the piece of music. The instruction receiver 33 determines that the first instruction Q1 is provided when the reproduction position Y reaches a time point of the first data. As will be understood from the above explanation, the first instruction Q1 is not limited to an instruction received from the user U. When the degree of scatter $\Delta$ is greater than the threshold $\Delta$th in the editing process Sb, the editing processor 34 may add the first data to the note N1.

(2) In each of the foregoing embodiments, the instruction receiver 33 receives manipulation of shifting the manipulation device 14 from the depressed state to the released state as the second instruction Q2. However, a mode of the second instruction Q2 is not limited to the example described above. In one example, the instruction receiver 33 may receive a manipulation of shifting the manipulation device 14 from the released state to the depressed state not only as the first instruction Q1 in the first embodiment but also as the second instruction Q2. In other words, a first manipulation including depressing and release of the movable member 141 may be received as the first instruction Q1, and a second manipulation including depressing and release of the movable member 141 may be received as the second instruction Q2.

A specific motion of the user U may be received as the second instruction Q2. To receive the motion of the user U, various types of detectors may be used such as a camera, an accelerometer and so forth. The instruction receiver 33 may determine, as the second instruction Q2, various motions such as a motion of the user U in lowering one hand, a motion to lower the musical instrument 80, or a breathing motion (for example, an exhaling motion). Breathing of the user U is a breath (intake of breath) taken when a wind instrument is played as the musical instrument 80. The manipulation velocity V2 in the second embodiment is comprehensively represented as a velocity of a motion of the user U determined as the second instruction Q2.

Specific data denoting the second instruction Q2 (hereafter, "second data") may be included in the performance data Db. The second data is, for example, a rest fermata symbol included in the piece of music. The instruction receiver 33 determines that the second instruction Q2 is provided when the reproduction position Y reaches a time point of the second data. As will be understood from the above explanation, the second instruction Q2 is not limited to an instruction from the user U.

As described in the examples described above, a configuration is assumed such that one of a pair of two manipulations by the user U is received as the first instruction Q1 and the other of the pair is received as the second instruction Q2. In one example, a motion of the user U in raising one hand is received as the first instruction Q1, and a subsequent motion of lowering one hand is received as the second instruction Q2. Alternatively, a motion of the user U to elevate the musical instrument 80 is received as the first instruction Q1, and a subsequent motion to lower the musical instrument 80 is received as the second instruction Q2. An inhaling motion of the user U may be received as the first instruction Q1, and a subsequent exhaling motion may be received as the second instruction Q2.

The type of motion of the user U received as the first instruction Q1 may be different from the type of motion of the user U received as the second instruction Q2. In other words, separate motions that can be performed independently by the user U may be respectively received as the first instruction Q1 and the second instruction Q2. In one example, the instruction receiver 33 may receive a manipulation received by the manipulation device 14 as the first instruction Q1, and may receive another motion such as elevation of the musical instrument 80 or the breathing motion as the second instruction Q2.

(3) In each foregoing embodiment, in each embodiment described above, automatic performance musical instrument is shown as one example of the performance device 20. However, the performance device 20 is not limited to the example described above. In one example, the performance device 20 may be a sound source system including both a sound generator that generates an audio signal of musical sounds in response to an instruction from the audio processing system 10, and a sound emitter that reproduces the musical sounds represented by the audio signal. The sound generator may be realized as a hardware sound source or a software sound source. The performance device 20 in the fifth embodiment is not limited to the examples described above. The performance device 20 in the fifth embodiment may be the sound source system.

In the fifth embodiment, variables are changeable by the user U, and all of the processes (Sc11-Sc14) included in the analysis process Sc1 are executed for each change of variables (Sc3: YES). However, conditions under which each of the processes (Sc11-Sc14) is executed are not limited to this example. Hereafter, a case is assumed in which the user U changes the variables by performing an operation on the operation images 71 (71a, 71b, 71c). Specifically, the user U selects any operation image 71 using the manipulation device 14, and moves the slider represented by the operation image 71 while the selection of the operation image 71 is maintained. The value of the variable is changed to a value that corresponds to a position of the operation image 71 at which the selection thereof is released. Release of the operation image 71 fixes the value of the variable.

A case is assumed in which the user U changes the variable α by operating the slider represented by the operation image 71a. During the process of moving the selected slider that is represented by the operation image 71a, the indicator calculator 51 repeats the indicator calculation process Sc11 to update the sound indicators C(t) for each repeat. The display controller 36 updates the transition image 64 in accordance with the updated sound indicators C(t) for each execution of the indicator calculation process Sc11. In other words, the indicator calculation process Sc11 and the update of the transition image 64 are executed in parallel with the movement of the slider represented by the operation image 71a (change of the variable α). In the selection of the slider represented by the operation image 71a, the period estimation process Sc12, the pitch estimation process Sc13, and the information generation process Sc14 are not executed. When the selection of the operation image 71a is released, the period estimation process Sc12, the pitch estimation process Sc13, and the information generation process Sc14 are executed using the sound indicators C(t) at the time at which the selection of the operation image 71a is released. Then the confirmation screen 60 is updated in accordance with results of these processes. In this configuration, the processing load of the adjustment process Sc is reduced since in the selection of the operation image 71a, the period estimation process Sc12, the pitch estimation process Sc13, and the information generation process Sc14 are not executed.

A case is assumed in which the user U changes the variable β by operating the slider represented by the operation image 71b. In the process of moving the selected slider that is represented by the operation image 71b, the period estimator 52 repeats the period estimation process Sc12 to updates the sound indicators G(t) for each repeat. The display controller 36 updates the performance period 621 on the confirmation screen 60 for each execution of the period estimation process Sc12. In the selection of the slider represented by the operation image 71a, the indicator calculation process Sc11, the pitch estimation process Sc13, and the information generation process Sc14 are not executed. When the movement of the slider represented by the selection of the operation image 71b is stopped (the selection of the operation image 71a is released), the pitch estimation process Sc13 and the information generation process Sc14 are executed using the sounded indicators G(t) at the time at which the slider is stopped. Then the confirmation screen 60 is updated in accordance with results of these processes.

A case is assumed in which the user U changes the variable by operating the slider represented by the operation image 71c. In the process of moving the slider that is selected and is represented by the operation image 71c, the analysis process Sc1 and the update of the confirmation screen 60 (Sc2) are executed. When the movement of the slider represented by the operation image 71c is stopped (the selection of the operation image 71a is released), the following are executed: (i) the pitch estimation process Sc13 to which the changed variable γ is applied; and (ii) the information generation process Sc14 to which the sound pitches K(t), which is calculated by the sound pitch estimation process Sc13. In this configuration, the processing load of the adjustment process Sc is reduced, since in the selection of the operation image 71a, the number of times the pitch estimation process Sc13 and the information generation process Sc14 are executed.

Figure 20:
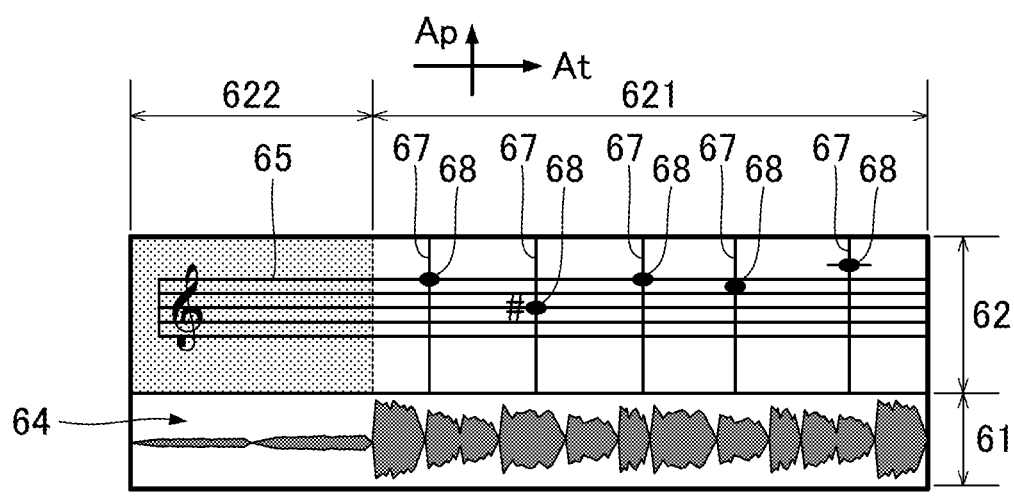
FIG. 20 is a schematic diagram of a confirmation screen according to a modification.

(5) The visual appearance of the transition image 64 representing the sound indicators C(t) is not limited to this example. In one example, as shown in FIG. 20, a waveform on the time axis may be shown on the display 15 as a transition image 64. In the transition image 64, the amplitude of the waveform at a time point t on the time axis At is set in accordance with a sound indicator C(t) at time point t. In one example, a waveform having a greater amplitude at time point t at which the sound indicator C(t) is larger is displayed as the transition image 64. The transition image 64 may be displayed to overlap with the staff notation 65.

(6) The method of calculating the sound indicators C(t) carried out by the indicator calculator 51 is not limited to the example described in the fifth embodiment. In one example, the indicator calculator 51 may calculate the sound indicators E(t, n) by subtracting an amplitude spectrum of the musical sound generated by the performance device 20 from an amplitude spectrum of the reference signal Zr. In one example, the amplitude spectrum of the musical sound of the performance device 20 may be generated by (i) a known sound source process, such as a process of generating a musical sound signal representative of a musical sound specified by the performance data Db, and (ii) a frequency analysis, such as a discrete Fourier transform carried out on the musical sound signal. The amplitude spectrum after the subtraction corresponds to a series of N sound indicators E(t, n), each of which corresponds to a different pitch Pn. Subtraction of the amplitude spectrogram representative of sounds generated by the performance device 20 is adjusted in accordance with the variable α.

(7) The process of estimating the performance period by use of the period estimator 52 is not limited to the example described in the fifth embodiment. In one example, the period estimator 52 estimates, as a performance period, a period during which a signal intensity of the reference signal Zr exceeds a threshold. The threshold is adjusted in accordance with on the variable β. The process of estimating the pitches K(t) by use of the pitch estimator 53 is not limited to the aforementioned example.

(8) In one example, the audio processing system 10 may be achieved by a server apparatus that communicates with a device, such as a smartphone or a tablet. In one example, the device includes a sound receiver 13 that generates an audio signal Z in accordance with a performance by the user U, and a performance device 20 that plays back a music piece based on instructions from the audio processing system 10. The device transmits, to the audio processing system 10 via the communication network, (i) the audio signal Z generated by the sound receiver 13, and (ii) first and second instructions Q1 and Q2 in response to the operation of the user U. On the basis of a play position X estimated from the audio signal Z, and the first and second instructions Q1 and Q2 received from the terminal device, the audio processing system 10 controls the performance device 20 of the device to reproduction the reproduction part of the music piece.

The play analyzer 31 may be mounted on the device. In this case, the device transmits the play position X estimated by the play analyzer 31 to the audio processing system 10. In this configuration, the play analyzer 31 is omitted from the audio processing system 10.

Similarly, the audio processing system 10 according to the fifth embodiment is achieved by the server apparatus. In one example, the audio processing system 10 generates reference data Da by using the analysis process Sc1, to which (i) the reference signal Zr received from the device and (ii) the performance data Db are applied. Then the audio processing system 10 to transmit the reference data Da to the device.

(9) The foregoing functions of the audio processing system 10 are achieved by cooperation of single or multiple processors constituting the controller 11 and the program stored in the storage device 12. The program of the present disclosure may be stored in a computer-readable recording medium, and this recording medium may be distributed and installed on a computer. In one example, the recording medium is a non-transitory recording medium, preferable examples of which include an optical recording medium (optical disc), such as a CD-ROM. However, the recording medium may be any recording medium, such as a semiconductor recording medium or a magnetic recording medium. Here, the concept of the non-transitory recording medium includes any recording medium except transitory, propagating signals. Volatile recording mediums are not excluded. In a case where a distribution apparatus distributes the program via a communication network, the non-transitory recording medium corresponds to a storage device that stores the program in the distribution apparatus.

G: Appendices

From the foregoing modifications, the following configurations are obtained, for example.

An audio processing system according to one aspect (Aspect 1) of the present disclosure includes at least one memory storing a program; and at least one processor that implements the program to: analyze an audio signal including sound from a first sound source; identify, based on the analysis of the audio signal, a series of sound indicators each representing a certainty that audio components of the first sound source are included in the audio signal; identify a series of pitches, each relating to the components of the first sound source; and cause a display device to display the series of the sound indicators and the identified series of the pitches along a common time axis.

In this aspect, a series of sound indicators and a series of pitches are displayed using the common time axis. Accordingly, a user is able to easily confirm and correct a result of the analysis of a sound signal during the process of generating reference data. Specifically, the user is able to make a visual and intuitive confirmation of temporal relationships between the sound indicators and the pitches.

In a specific example (Aspect 2) according to Aspect 1, the audio processing system further includes a sound receiver that receives the sound emitted from the first sound source and sound emitted from a second sound source to generate the audio signal, in which the audio signal includes: the audio components of the first sound source; and audio components of the second sound source, in which the at least one processor, to identify the series of sound indicators: calculates a first indicator that corresponds to intensities of the audio signal; calculates a second indicator that corresponds to an intensity of the audio components of the second sound source using performance data representative of a sound intensity of each note of the second sound source; and subtracts the second indicator from the first indicator, and in which each of the series of the sound indicators indicates a result of the subtraction.

In this aspect, a first indicator corresponds to intensities of the audio signal including audio components of the first sound source and audio components of the second sources. A second indicator is calculated in accordance with performance data. A sound indicator is obtained by subtracting the second indicator from the first indicator. Accordingly, in the sound indicator obtained by this subtraction (i.e., a sound indicator in which the audio components of the first sound source is emphasized), the dependence of the audio components of the second sound source on the first indicator is reduced.

In a specific example (Aspect 3) according to Aspect 2, the at least one processor calculates the second sound indicator using a first variable that is set in response to an instruction from a user, and the second indicator changes in accordance with the first variable.

In this aspect, the user is able to adjust the sound indicator to conform a known content of sound (e.g., performance) of the first sound source.

In a specific example (Aspect 4) according to any one of Aspects 1 to 3, the at least one processor further implements the program to identify a sounding period during which the audio components of the first sound source are present, and the at least one processor also causes the display device to display, the sounding period along the common time axis.

In this aspect, the user is able to visually and easily confirm temporal relations among the sound indicator, the pitch and a sounding period of the first sound source.

In a specific example (Aspect 5) according to Aspect 4, the at least one processor identifies the sounding period using a second variable that is set in response to an instruction from a user, and the sounding period changes in accordance with the second variable.

In this aspect, the user is able to adjust the sounding period to conform a known content of sound (e.g., performance) of the first sound source.

In a specific example (Aspect 6) according to any one of Aspects 1 to 5, the at least one processor causes the display device to display a sound point at which a pitch of the series of the pitches changes along the common time axis.

In this aspect, the user is able to visually and easily confirmation temporal relations among the sound indicator, the pitch and the sound point of the first sound source.

In a specific example (Aspect 7) according to Aspect 6, the at least one processor identifies the series of pitches of the audio components of the first sound source using a third variable that is set in response to an instruction from a user, and a number of the sound point changes in accordance with the third variable.

In this aspect, the user is able to adjust a sound point to conform a known content of sound (e.g., performance) of the first sound source.

In a specific example (Aspect 8) according to Aspect 2, the sound receiver is a microphone.

A computer-implemented audio processing method according to one aspect (Aspect 9) of the present disclosure includes analyzing an audio signal including sound from a first sound source; identifying, based on the analyzing of the audio signal, a series of sound indicators each representing a certainty that audio components of the first sound source are included in the audio signal; identifying a series of pitches each relating to the components of the first sound source; and displaying, on a display device, the series of the sound indicators and the identified series of the pitches along a common time axis.

The analysis process Sc1 shown in FIG. 19 is an example of "analyzing an audio signal" according to Aspect 9. Step Sc2 shown in FIG. 19 is an example of "displaying, on a display device, the series of the sound indicators and the identified series of pitches along a common time axis" according to Aspect 9.

A non-transitory recording medium for storing a program executable by a computer to execute a method according to one aspect (Aspect 10) of the present disclosure includes analyzing an audio signal including sound from a first sound source; identifying, based on the analyzing of the audio signal, a series of sound indicators each representing a certainty that audio components of the first sound source are included in the audio signal; identifying a series of pitches each relating to the components of the first sound source; and displaying, on a display device, the series of the sound indicators and the series of the pitches along a common time axis.

DESCRIPTION OF REFERENCE SIGNS

100 . . . reproduction system, 10 . . . audio processing system, 11 . . . controller, 12 . . . storage device, 13 . . . sound receiver, 14 . . . manipulation device, 15 . . . display, 20 . . . performance device, 21 . . . drive mechanism, 22 . . . sound emitting mechanism, 31 . . . play analyzer, 32 . . . reproduction controller, 33 . . . instruction receiver, 34 . . . editing processor, 35 . . . preparation processor, 36 . . . display controller, 41 . . . first recorder, 42 . . . second recorder, 43 . . . audio analyzer, 51 . . . indication calculator, 52 . . . period estimator, 53 . . . pitch estimator, 54 . . . information generator, 60 . . . confirmation screen, 61 . . . first area, 62 . . . second area, 64 . . . transition image, 65 . . . staff notation, 67 . . . instruction image, 68 . . . note image, 71 (71a, 71b, 71c) . . . operation image, 72 . . . operation image, 80 . . . musical instrument, 141 . . . movable member, 511 . . . first analyzer, 512 . . . second analyzer, 513 . . . first calculator, 514 . . . second calculator, 621 . . . performance period, 622 . . . non-performance period.

What is claimed is:

1. An audio processing system comprising:
a sound receiver that:
receives first sound emitted from a first sound source and second sound emitted from a second sound source; and
outputs an audio signal representative of the first sound and the second sound;
at least one memory storing a program; and
at least one processor that implements the program to:
analyze the audio signal and identify:
a series of first pitches in the first sound;
a series of second pitches in the second sound;
a series of sound indicators each representing a degree of certainty that a corresponding one of the identified series of first pitches in the first sound is included in the audio signal, wherein, in calculating the series of sound indicators, the processor:
calculates a first indicator that corresponds to a first sound intensity of each of the identified series of first pitches and the identified series of second pitches in the audio signal;
calculates a second indicator that corresponds to a sound intensity of each of a series of pitches represented in performance data corresponding to the second sound source; and
subtracts the second indicator from the first indicator, at each corresponding time point on a common time axis,
wherein each of the series of sound indicators indicates a result of the subtraction; and
cause a display device to display the identified series of sound indicators as an image and the identified series of first pitches along the common time axis.

2. The audio processing system according to claim 1, wherein:
the at least one processor calculates the second sound indicator using a first variable that is set in response to an instruction from a user, and
the second indicator changes in accordance with the first variable.

3. The audio processing system according to claim 1, wherein:
the at least one processor further implements the program to identify a sounding period during which the identified series of first pitches are present, and
the at least one processor also causes the display device to display, the sounding period along the common time axis.

4. The audio processing system according to claim 3, wherein:
the at least one processor identifies the sounding period using a second variable that is set in response to an instruction from a user, and the sounding period changes in accordance with the second variable.

5. The audio processing system according to claim 1, wherein the at least one processor causes the display device to display a sound point at which a pitch, among the identified series of first pitches, changes along the common time axis.

6. The audio processing system according to claim 5, wherein:
- the at least one processor identifies the series of first pitches using a third variable that is set in response to an instruction from a user, and
- a number of the sound point changes in accordance with the third variable.

7. The audio processing system according to claim 1, wherein the sound receiver is a microphone.

8. A computer-implemented audio processing method comprising:
- receiving first sound emitted from a first sound source and second sound emitted from a second sound source;
- outputting an audio signal representative of the first sound and the second sound;
- analyzing the audio signal and identifying:
  - a series of first pitches in the first sound;
  - a series of second pitches in the second sound;
  - a series of sound indicators each representing a degree of certainty that a corresponding one of the identified series of first pitches in the first sound is included in the audio signal by:
    - calculating a first indicator that corresponds to a first sound intensity of each of the identified series of first pitches and the identified series of second pitches in the audio signal;
    - calculating a second indicator that corresponds to a sound intensity of each of a series of pitches represented in performance data corresponding to the second sound source; and
    - subtracting the second indicator from the first indicator, at each corresponding time point on a common time axis,
    - wherein each of the series of sound indicators indicates a result of the subtraction; and
- displaying, on a display device, the identified series of sound indicators as an image and the identified series of first pitches along the common time axis.

9. A non-transitory recording medium for storing a program executable by a computer to execute a method comprising:
- receiving first sound emitted from a first sound source and second sound emitted from a second sound source;
- outputting an audio signal representative of the first sound and the second sound;
- analyzing the audio signal and identifying:
  - a series of first pitches in the first sound;
  - a series of second pitches in the second sound;
  - a series of sound indicators each representing a degree of certainty that a corresponding one of the identified series of first pitches in the first sound is included in the audio signal by:
    - calculating a first indicator that corresponds to a first sound intensity of each of the identified series of first pitches and the identified series of second pitches in the audio signal;
    - calculating a second indicator that corresponds to a sound intensity of each of a series of pitches represented in performance data corresponding to the second sound source; and
    - subtracting the second indicator from the first indicator, at each corresponding time point on a common time axis,
    - wherein each of the series of sound indicators indicates a result of the subtraction; and
- displaying, on a display device, the identified series of sound indicators as an image and the identified series of first pitches along the common time axis.

* * * * *